US011789920B1

(12) United States Patent
Brendle et al.

(10) Patent No.: US 11,789,920 B1
(45) Date of Patent: Oct. 17, 2023

(54) FRAMEWORK FOR WORKLOAD PREDICTION AND PHYSICAL DATABASE DESIGN

(71) Applicant: SAP SE, Walldorf (DE)

(72) Inventors: Michael Brendle, Leimen (DE); Norman May, Karlsruhe (DE); Robert Schulze, Chemnitz (DE); Alexander Boehm, Schwetzingen (DE); Michael Grossniklaus, Kreuzlingen (CH); Guido Moerkotte, Schriesheim (DE)

(73) Assignee: SAP SE, Walldorf (DE)

( * ) Notice: Subject to any disclaimer, the term of this patent is extended or adjusted under 35 U.S.C. 154(b) by 11 days.

(21) Appl. No.: 17/705,728

(22) Filed: Mar. 28, 2022

(51) Int. Cl.
*G06F 16/22* (2019.01)
*G06F 11/34* (2006.01)
*G06F 16/25* (2019.01)
*G06F 16/21* (2019.01)

(52) U.S. Cl.
CPC ...... *G06F 16/2282* (2019.01); *G06F 11/3414* (2013.01); *G06F 16/213* (2019.01); *G06F 16/256* (2019.01)

(58) Field of Classification Search
CPC .................. G06F 2209/5019; G06F 9/5027
USPC ......................................................... 707/803
See application file for complete search history.

(56) References Cited

U.S. PATENT DOCUMENTS

| 2006/0129771 A1* | 6/2006 | Dasgupta | ............. G06F 3/0605 711/162 |
| 2021/0096996 A1* | 4/2021 | Jalaparti | ............. H04L 67/1097 |
| 2022/0129316 A1* | 4/2022 | Sheoran | ................ G06F 9/5027 |

* cited by examiner

*Primary Examiner* — Hung T Vy
(74) *Attorney, Agent, or Firm* — Buckley, Maschoff & Talwalkar LLC

(57) ABSTRACT

According to some embodiments, methods and systems may be associated with a cloud computing environment. A workload prediction framework may receive observed workload information associated with a database in the cloud computing environment (e.g., a DataBase as a Service ("DBaaS")). Based on the observed workload information, a Statement Arrival Rate ("SAR") prediction may be generated. In addition, a host variable assignment prediction may be generated based on the observed workload information. The workload prediction framework may then use the SAR prediction and the host variable assignment prediction to automatically create a workload prediction for the database. A physical database design advisor (e.g., a table partitioning advisor) may receive the workload prediction and, responsive to the workload prediction, automatically generate a recommended physical layout for the database (e.g., using a cost model, the current physical layout, and an objective function).

21 Claims, 30 Drawing Sheets

| SQL Statement | Statement $q_2$ |
|---|---|
| Observed SAR: | $F(t, \mathcal{O}, q_2)$ <br> $\Delta(o_e, o_e)$ |
| Linear | $|0.78| \not\geq 0.8$ ✗ |
| Exponential | $|0.99| \geq 0.8$ ✓ |
| Reoccurring | $|554 + 598i| \geq 0.8$ ✓ |
| Static | $816 \not\leq 0.1 \cdot 495$ ✗ |

Classification: EXPONENTIAL

*FIG. 11B*

| SQL Statement | Statement $q_5$ |
|---|---|
| Oberved SAR: | $F(t, \mathcal{O}, q_5)$ <br><br> $\Delta(o_e, o_e)$ |
| Linear | $\|0.05\| \not\geq 0.8$ ✗ |
| Exponential | $\|0.05\| \not\geq 0.8$ ✗ |
| Reoccurring | $\|-41+33i\| \not\geq 1000$ ✗ |
| Static | $132 \leq 0.1 \cdot 10250$ ✓ |

Classification: STATIC

*FIG. 11E*

| SQL Statement | Statement $q_6$ |
|---|---|
| Observed SAR: | $F(t, \mathcal{O}, q_6)$<br>$\Delta(o_e, o_e)$ |
| Linear | $|0.69| \not\geq 0.8$ ✗ |
| Exponential | $|0.69| \not\geq 0.8$ ✗ |
| Reoccurring | $|164 + 597i| \not\geq 700$ ✗ |
| Static | $829 \not\leq 0.1 \cdot 7457$ ✗ |

Classification: IRREGULAR

*FIG. 11F*

FRAMEWORK FOR WORKLOAD PREDICTION AND PHYSICAL DATABASE DESIGN

BACKGROUND

An enterprise may utilize a cloud computing environment to let users perform tasks. For example, the enterprise might let various users execute an application via the cloud computing environment to process purchase orders, adjust human resources information, generate invoices, etc. The cloud computing environment may be associated with one or more databases, and the physical layout of such databases can substantially impact performance and memory consumption. As a result, an inappropriate physical layout can significantly degrade performance or increase the memory consumption and thereby increase the hardware costs of an organization operating the database (the increase of hardware costs may be a consequence of bad performance or increased memory consumption). Because the amount of provisioned Dynamic Random Access Memory ("DRAM") dominates hardware costs, DataBase-as-a-Service ("DBaaS") providers in particular must carefully consider the economical tradeoffs between memory consumption and performance. Finding an optimal physical layout, e.g., with respect to memory consumption or performance, is a complex and time-consuming process usually performed by database experts. As a result, academia and industry developed tools for automated physical database design. Typically, such automated approaches focus on static workloads. Note, however, that workloads will change over time. Whenever workload changes are not addressed timely the current physical layout may no longer be optimal, resulting in a significant degradation in performance or an increase in memory consumption. The question of how to find appropriate physical layouts for workloads that will change over time is largely open despite high practical relevance.

It would therefore be desirable to provide accurate and efficient workload predictions which can serve as an input to a physical database design advisor. As a consequence, the physical layout may be timely adapted to workload changes and therefore be optimized for the future workload, such that future high performance and/or low memory consumption is achieved.

SUMMARY

According to some embodiments, methods and systems may be associated with a cloud computing environment. A workload prediction framework may receive observed workload information associated with a database in the cloud computing environment (e.g., a DBaaS). Based on the observed workload information, a Statement Arrival Rate ("SAR") prediction may be generated. In addition, a host variable assignment prediction may be generated based on the observed workload information. The workload prediction framework may then use the SAR prediction and the host variable assignment prediction to automatically create a workload prediction for the database. A physical database design advisor (e.g., a table partitioning advisor) may receive the workload prediction and, responsive to the workload prediction, automatically generate a recommended physical layout for the database (e.g., using a cost model, the current physical layout, and an objective function). Note that the current physical layout may be considered in this decision as switching from one to another layout can also degrade performance or increase memory consumption.

Some embodiments comprise means for receiving, by a computer processor of a workload prediction framework, observed workload information associated with a database in the cloud computing environment; based on the observed workload information, means for generating a SAR prediction; based on the observed workload information, means for generating a host variable assignment prediction; means for automatically creating a workload prediction for the database using the SAR prediction and the host variable assignment prediction; and responsive to the workload prediction, means for automatically generating a recommended physical layout for the database by a physical database design advisor.

Some technical advantages of some embodiments disclosed herein are improved systems and methods to provide accurate and efficient workload predictions which can serve as an input to a physical database design advisor.

BRIEF DESCRIPTION OF THE DRAWINGS

FIGS. 11A through 11F show examples of detection and classification of SAR for various SQL statements in accordance with some embodiments.

DETAILED DESCRIPTION

Figure 1A:
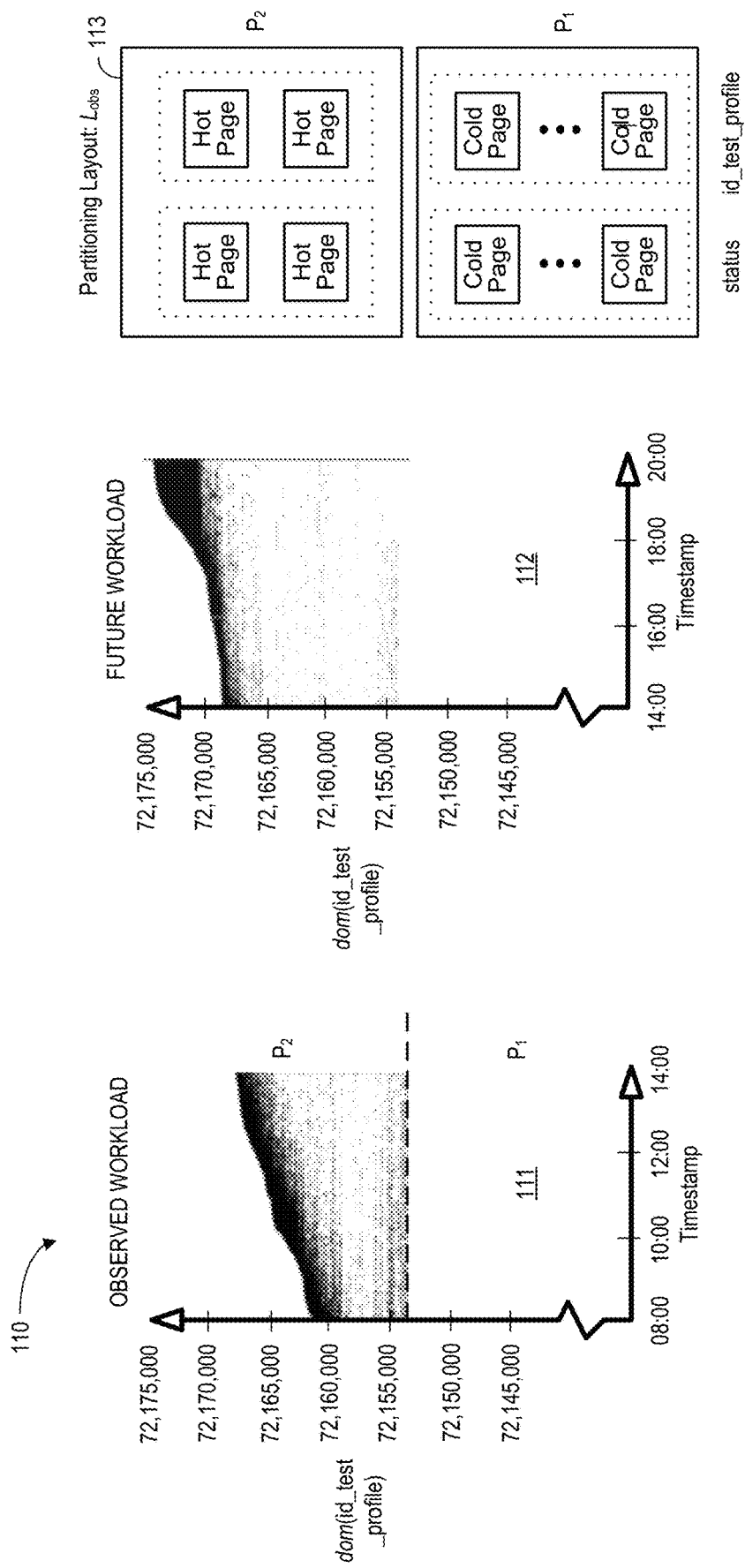
FIGS. 1A through 1B illustrate table partitioning layouts.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components, and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Real-world applications are characterized by workloads where the arrival rate and parameterization of Structured Query Language ("SQL") statements can change over time. Without continuous adjustments of the physical layout to reflect such workload drifts, memory consumption and performance can deteriorate significantly. Existing approaches for automated physical database design, particularly table partitioning advisors, fail to address workload drifts because the physical layouts they propose are based on the observed workload. Some embodiments described herein provide a framework for the continuous adaptation of physical layout under workload drifts. Some embodiments predict the future workload based on detected workload drifts in the arrival rate and in the parameterization of SQL statements. The predicted workload is then fed into a physical database design advisor. Using a real-world application, accurate predictions of the future workload and a substantial hardware cost reduction on a commercial cloud database can be achieved compared to existing approaches.

Consider a stream of parameterized SQL statements (SELECT, INSERT, UPDATE, DELETE, ...) as the workload, where each statement contains host variables that are assigned by parameter values at execution time. A workload drift is then characterized by a temporal change in the arrival rate of statements or in the parameter values assigned to the host variables. Whenever workload drifts are not addressed in a timely fashion, the current physical layout may no longer be optimal, which can lead to a significant increase in workload costs.

A straightforward method to deal with workload drifts is to repeatedly feed the observed workload into a physical database design advisor, e.g., at fixed intervals. Such an approach is inherently backward-looking as the suggested physical layout lags behind workload drifts and may already be suboptimal when data reorganization (e.g., table repartitioning) starts. By contrast, some embodiments described herein provide a forward-looking approach that determines the new physical layout using a prediction of the future workload. Typical workload predictors are only able to forecast a future arrival rate of statements. However, physical database design advisors, in particular table partitioning advisors, often rely on fine-granular workload statistics, e.g., the parameterization of SQL statements. As a result, some embodiments described herein predict the future parameter values assigned to the host variables (in addition to the arrival rate of statements).

As a real-world scenario for workload drift, consider historical test results that many software development projects store in a database to identify bugs or authorize patches. For instance, the SAP® HANA development project retains statistics on more than 30 billion test runs. The corresponding test result database groups related test cases (e.g., TPC-H benchmark queries) into test profiles. Therefore, the statement "SELECT status FROM test cases WHERE id_test_profile=:1" returns the status (e.g., running, successfully executed, or failed) of all test cases with the given test profile ID.

Figure 1B:
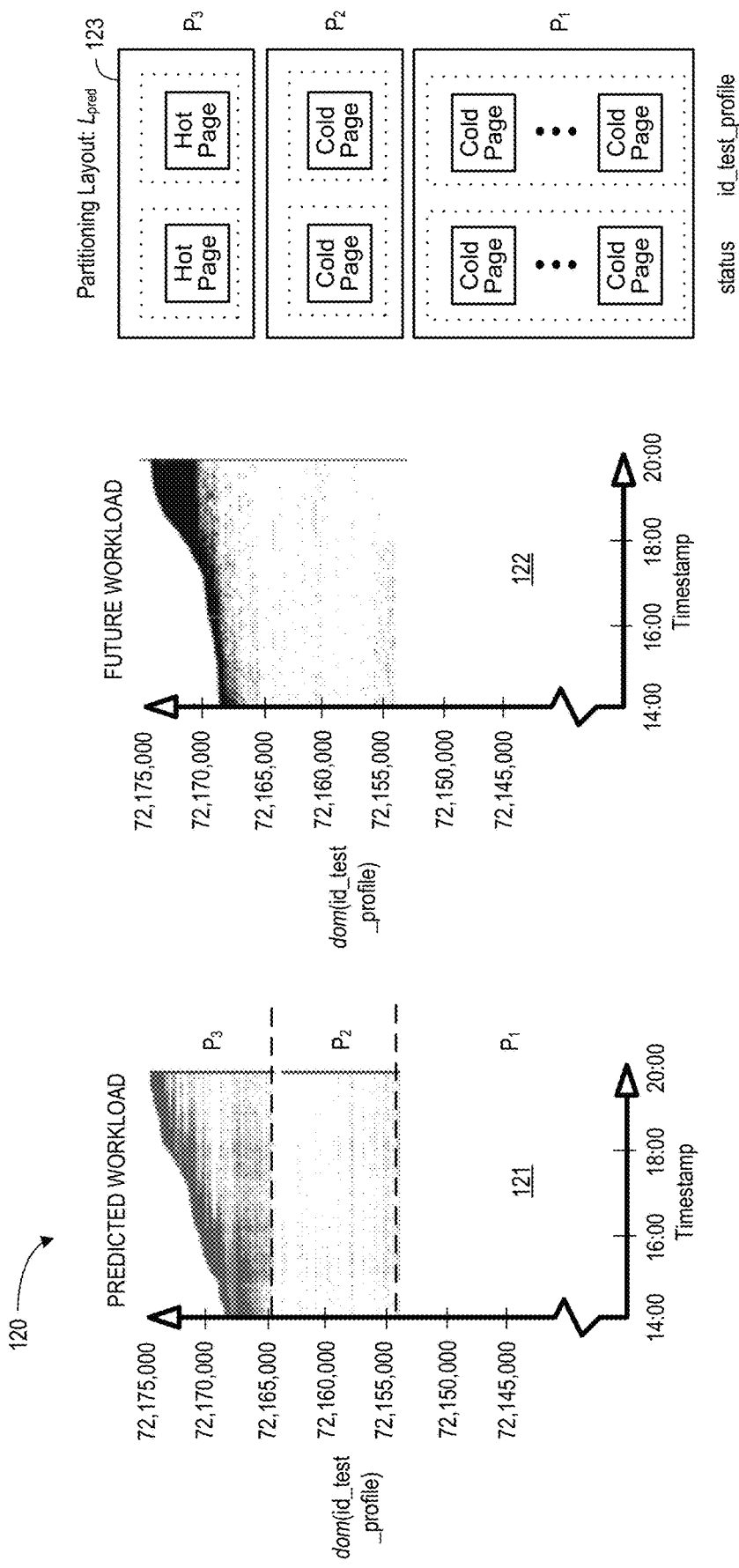

FIGS. 1A through 1B illustrate table partitioning layouts. In particular, FIG. 1A is a backward-looking approach 110 where a currently observed workload 111 ($\mathcal{O}$) is used create partitions $P_1$ and $P_2$ in layout $L_{obs}$ 113 (regardless of what the future workload 112 ($\mathcal{F}$) looks like). Note that most of the statement instantiations are above 72,154,000 in the future workload and only few statement instantiations are below 72,154,000. As a consequence, the four pages of $P_2$ are hot because only those pages are frequently accessed (and need to stay in DRAM) while all pages of $P_1$ are cold because those pages are only rarely accessed (and can be evicted to cheaper secondary storage). $P_2$ contains four hot pages (which need to stay in DRAM) to handle statement instantiations above 72,154,000 while $P_1$ has cold pages to handle statement instantiations below 72,154,000. Note that each partition 113 may be associated with multiple columns (e.g., one for status and one for id_test_profile as illustrated by dotted lines in FIG. 1A) and the approach 110 is associated with the observed workload during a six-hour time window (from 08:00 to 14:00) on a regular workday. Each dot represents a statement execution at a specific time (x-axis) with a specific parameter value (y-axis) assigned to host variable:1. Observe that the workload drifts over time as the later the statement is instantiated, the larger the parameter value becomes.

Using the backward-looking approach 110, a table partitioning advisor proposes layout $L_{obs}$ 113 that groups frequently accessed records into hot partition $P_2$ and all other records into cold partition $P_1$. In contrast, FIG. 1B is a forward-looking approach 120 where a predicted workload 121 ($\mathcal{P}$) is used to create partitions $P_1$, $P_2$, and $P_3$ in layout $L_{obs}$ 123 (closer to what the future workload 122 ($\mathcal{F}$) looks like as compared to FIG. 1A). $P_1$ contains two hot pages (which need to stay in DRAM) to handle statement instantiations above 72,164,000 while $P_2$ and $P_3$ have cold pages to handle statement instantiations below 72,164,000. The proposed layout $L_{pred}$ 123 groups frequently accessed records into a hot partition $P_3$, while rarely and never accessed records are separated into cold partitions $P_2$ and $P_1$. In order to assess how both approaches 110, 120 impact memory consumption, one may execute the actual future workload 122 ($\mathcal{F}$) in SAP® HANA's column store using both layouts 113, 123. The data is stored on pages, not clustered by id_test_profile and no index exists on id_test_profile. FIG. 1B shows whether the pages of the status and id_test_profile columns in $L_{obs}$ 113 and $L_{pred}$ 123 were classified as hot or cold (based on the five-minute rule). Overall, layout $L_{pred}$ 123, as proposed by the forward-looking approach 120, reduces the number of hot pages held in DRAM by a factor of two as compared to $L_{obs}$ 113 as suggested by the backward-looking approach 110. The main reason is that the small, hot partition $P_3$ of $L_{pred}$ allows for a more aggressive partition pruning during the evaluation of the selection predicate than the large partition $P_2$ of $L_{obs}$ 113 since most statement instantiations are above 72,164,000 in the actual future workload. Therefore, only partition $P_3$ in $L_{pred}$ and $P_2$ in $L_{obs}$ needs to be accessed for most of the statement instantiations. As $P_3$ in $L_{pred}$ contains only two pages while $P_2$ in $L_{obs}$ contains four pages the memory consumption with $L_{pred}$ can be reduced by a factor of two as compared to $L_{obs}$.

Thus, the goal of some embodiments may be to find a predicted workload $\mathcal{P}$ from an observed workload $\mathcal{O}$, such that the predicted workload $\mathcal{P}$ approximates the future workload $\mathcal{P}$. There may be several challenges, however, when trying to predict the future workload $\mathcal{P}$ based on the observed workload $\mathcal{O}$. In real-world applications, various workload drift types (e.g., linear, exponential, reoccurring, static, and irregular) have been identified. Moreover, these drift types can also overlap. For an individual statement, the arrival rate as well as the assignments of parameter values to host variables can be impacted by different drift types. Therefore, a workload predictor must be able to handle multiple drift types (and at least some combinations thereof) at the arrival rate and assignment level.

Moreover, many real-world applications are characterized by a continuously drifting workload, thus necessitating regular readjustments of the physical layout. However, the data reorganization (e.g., table repartitioning) incurred by changing the physical layout can be prohibitively costly. Therefore, a change in the physical layout might only be advised when the expected benefits of workload cost reductions outweigh the cost of data reorganization.

Figure 2:
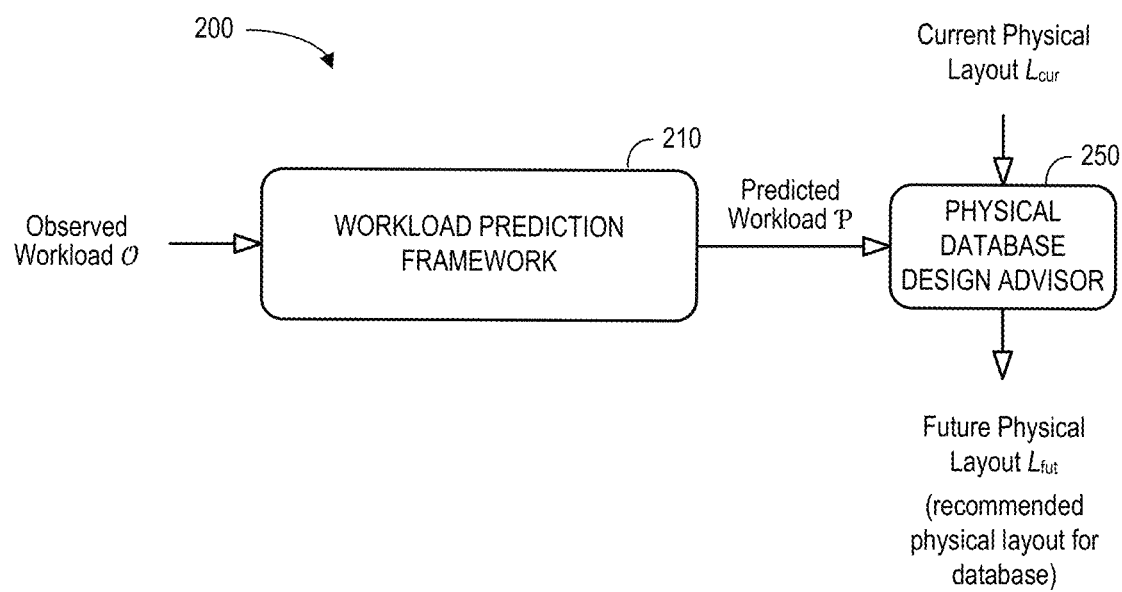
FIG. 2 is a high-level block diagram associated with a cloud-based computing system in accordance with some embodiments.

To address these challenges, some embodiments described herein provide a system 200 that consists of two phases as illustrated in FIG. 2. In the first phase, a workload prediction framework 210 predicts the future workload. In the second phase, the predicted workload is provided to a physical database design advisor 250 along with information about the current physical layout which can then automatically create a recommended future physical layout for a database. Note that the current physical layout may be used as an input to the physical database design advisor (since a change in the physical layout might only be advised when the expected benefits of workload cost reductions outweigh the cost of data reorganization). The term "automatically" may refer to a process that requires little or no human intervention. As illustrated by the system 300 of FIG. 3, a workload prediction framework 310 may predict the future Statement Arrival Rate ("SAR") 320 and the future assignments of parameter values to host variables 330 to create the predicted workload that is given to a physical database design advisor 350 along with information about the current physical layout. Some embodiments may incorporate table repartitioning costs in the physical design advice phase. Furthermore, the system 300 may allow for the exchanging or extending all components to support workload drifts in novel environments. In addition, both phases may be periodically repeated to ensure a continuous adaption of the physical layout.

As used herein, devices, including those associated with the system 300 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

Figure 3:
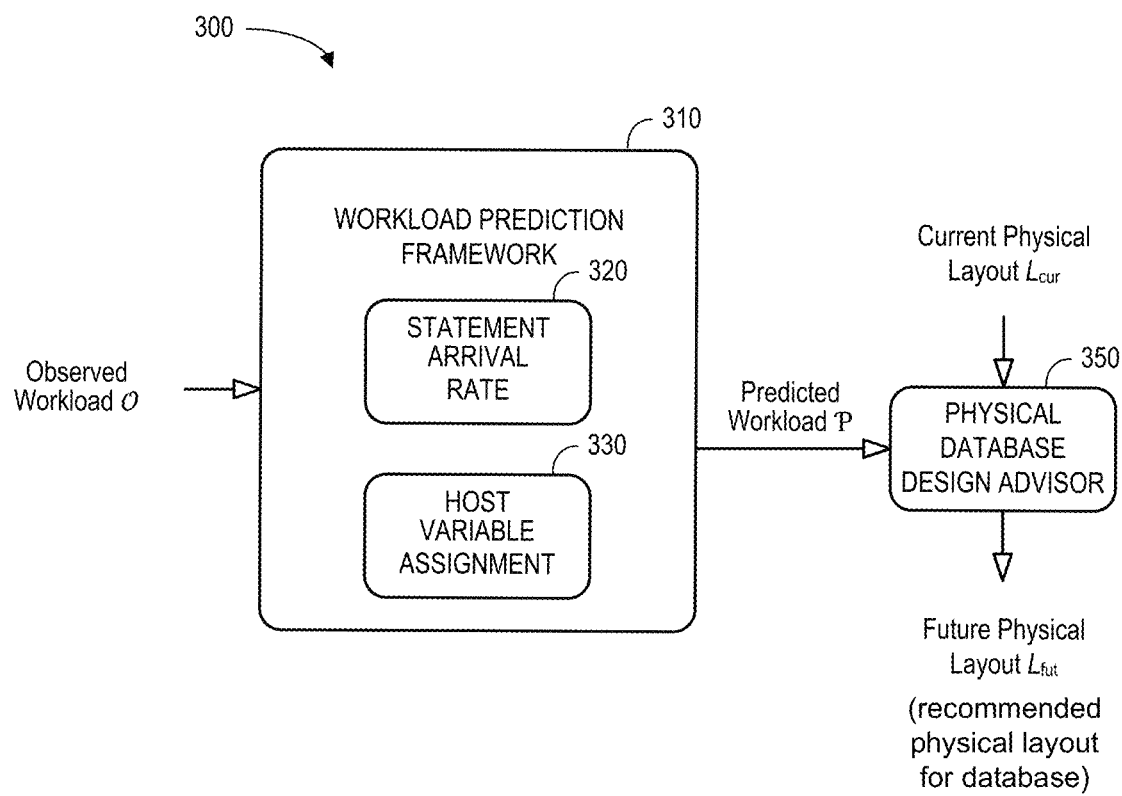
FIG. 3 is a more detailed diagram of a system according to some embodiments.

The workload prediction framework 310 and physical database design advisor 350 may store information into and/or retrieve information from various data stores (e.g., various predictions or recommendation), which may be locally stored or reside remote from the workload prediction framework 310 and/or physical database design advisor 350. Although a single workload prediction framework 310 and physical database design advisor 350 are shown in FIG. 3, any number of such devices may be included. Moreover, various devices described herein might be combined according to embodiments of the present invention. For example, in some embodiments, the workload prediction framework 310 and physical database design advisor 350 might comprise a single apparatus. The system 300 functions may be performed by a constellation of networked apparatuses, such as in a distributed processing or cloud-based architecture.

An administrator may access the system 300 via a remote device (e.g., a Personal Computer ("PC"), tablet, or smartphone) to view information about and/or manage operational information in accordance with any of the embodiments described herein. In some cases, an interactive Graphical User Interface ("GUI") display may let an operator or administrator define and/or adjust certain parameters via the remote device (e.g., to adjust prediction rules or logic, alter $\varphi_{lin}$ and/or $\varphi_{exp}$, map elements to data sources, etc.) and/or provide or receive automatically generated recommendations, results, or alerts associated with the system 300.

Figure 4:
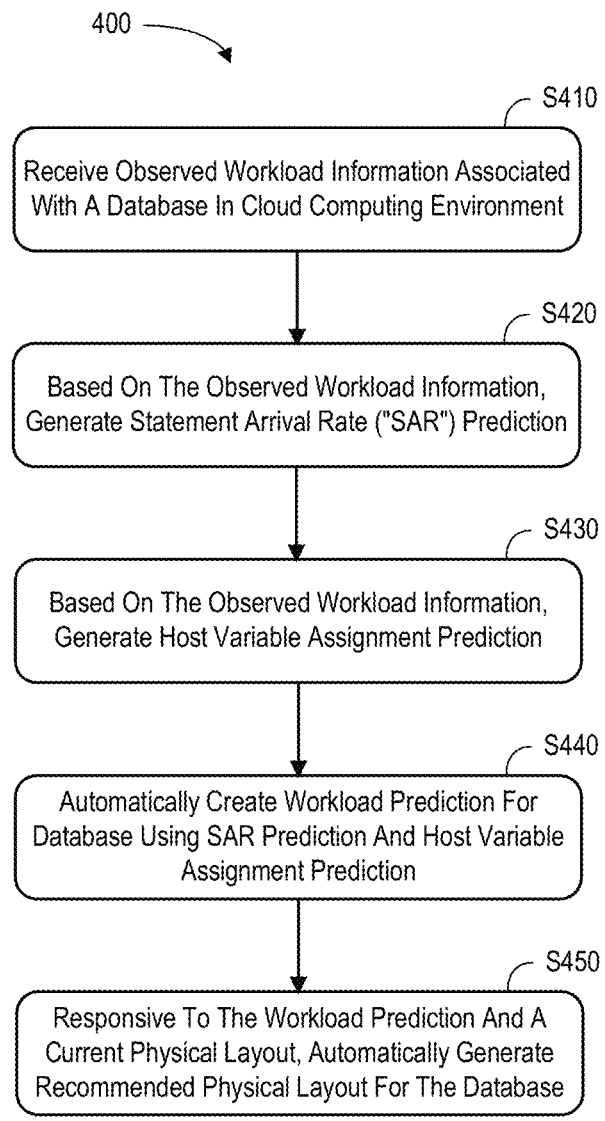
FIG. 4 is a custom adapter creation method in accordance with some embodiments.

FIG. 4 is a method 400 that might be performed by some or all of the elements of the systems 200, 300 described with respect to FIGS. 2 and 3. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S410, a computer processor of a workload prediction framework may receive observed workload information associated with a database (e.g., a DBaaS), such as one implemented in a cloud computing environment. Based on the observed workload information, the system may generate a SAR prediction at S420. Based on the observed workload information, the system may also generate a host variable assignment prediction at S430. At S440, the system can then automatically create a workload prediction for the database using the SAR prediction and the host variable assignment prediction. Responsive to the workload prediction and a current physical layout, at S450 a physical database design advisor automatically generates a recommended physical layout for the database.

To discuss the problem of predicting a future workload based on an observed workload, notation as set forth in Table I will be utilized.

TABLE I

Notation for Workload Prediction

| | |
|---|---|
| $Q = \{q_1, \ldots, q_i, \ldots, q_n\}$ | Set of n parameterized SQL statements |
| $h_i = [h_{i1}, \ldots, h_{ij}, \ldots, h_{im_i}]$ | Vector of $m_i$ host variables of $q_i \in Q$ |
| $v_i = [v_{i1}, \ldots, v_{ij}, \ldots, v_{im_i}]$ | Vector of $m_i$ parameter values |
| $(t, q_i, v_i)$ | Instantiation of statement $q_i$ with $v_i$ at timestamp t |
| $\mathcal{W}$ | Workload (set of p statement instantiations) |
| $\mathcal{A}(\mathcal{W}, h_{ij})$ | All assignments to host variable $h_{ij}$ in workload $\mathcal{W}$ |
| $\mathcal{O}, \mathcal{F}, \mathcal{P}$ | Observed, future, and predicted workload |
| $o_s, o_e$ | Start and end timestamps of $\mathcal{O}$ |
| $f_s, f_e$ | Start and end timestamps of $\mathcal{F}$ and $\mathcal{P}$ |

$Q = \{q_1, \ldots, q_i, \ldots, q_n\}$ may be defined as a set of $n \in \mathbb{N}$ parameterized SQL statements (e.g., SELECT, INSERT, UPDATE, and DELETE statements). Each statement $q_i \in Q$ contains a vector $h_i = [h_{i1}, \ldots, h_{ij}, \ldots, h_{im_i}]$ of $m_i \in \mathbb{N}$ host variables. The triple $(t, q_i, v_i)$ may be defined as an instantiation of $q_i \in Q$ with vector $v_i = [v_{i1}, \ldots, y_{ij}, \ldots, v_{im_i}]$ of $m_i$ parameter values at timestamp $t \in \mathbb{N}$. A statement instantiation $(t, q_i, v_i)$ contains $m_i$ assignments, such that parameter value $v_{ij} \in \text{dom}(h_{ij})$ is assigned to host variable $h_{ij}$ at timestamp t, where $\text{dom}(h_{ij})$ denotes the domain of $h_{ij}$. Workload $\mathcal{W} = \{(t_1, q_{i_1}, v_{i_1}), \ldots, (t_p, q_{i_p}, v_{i_p})\}$ may be defined as a set of $p \in \mathbb{N}$ statement instantiations. Further, $\mathcal{A}(\mathcal{W}, h_{ij})$ may be defined as the set of all assignments to host variable $h_{ij}$ in workload $\mathcal{W}$ by certain parameter values at certain timestamps (note that $v_{ij}$ is part of $v_i$):

$$\mathcal{A}(\mathcal{W}, h_{ij}) : \mathbb{N} : \{(t, v_{ij}) | (t, q_i, v_i) \in \mathcal{W}, v_{ij} \text{ is assigned to } h_{ij}\}.$$

Let $o_s, o_e, f_s, f_e \in \mathbb{N}$ be four timestamps, such that $o_s < o_e < f_s < f_e$. Define an observed workload as $\mathcal{O}$, such that $\forall (t, q_i, v_i) \in \mathcal{O}: o_s < t < o_e$, and a future workload as $\mathcal{F}$, such that $\forall (t, q_i, v_i) \in \mathcal{F}: f_s < t < f_e$. Some embodiments described herein find a predicted workload $\mathcal{P}$ from an observed workload $\mathcal{O}$, where $\forall (t, q_i, v_i) \in \mathcal{P}: f_s < t < f_e$, such that the predicted workload $\mathcal{P}$ approximates the future workload $\mathcal{F}$.

Figure 5:
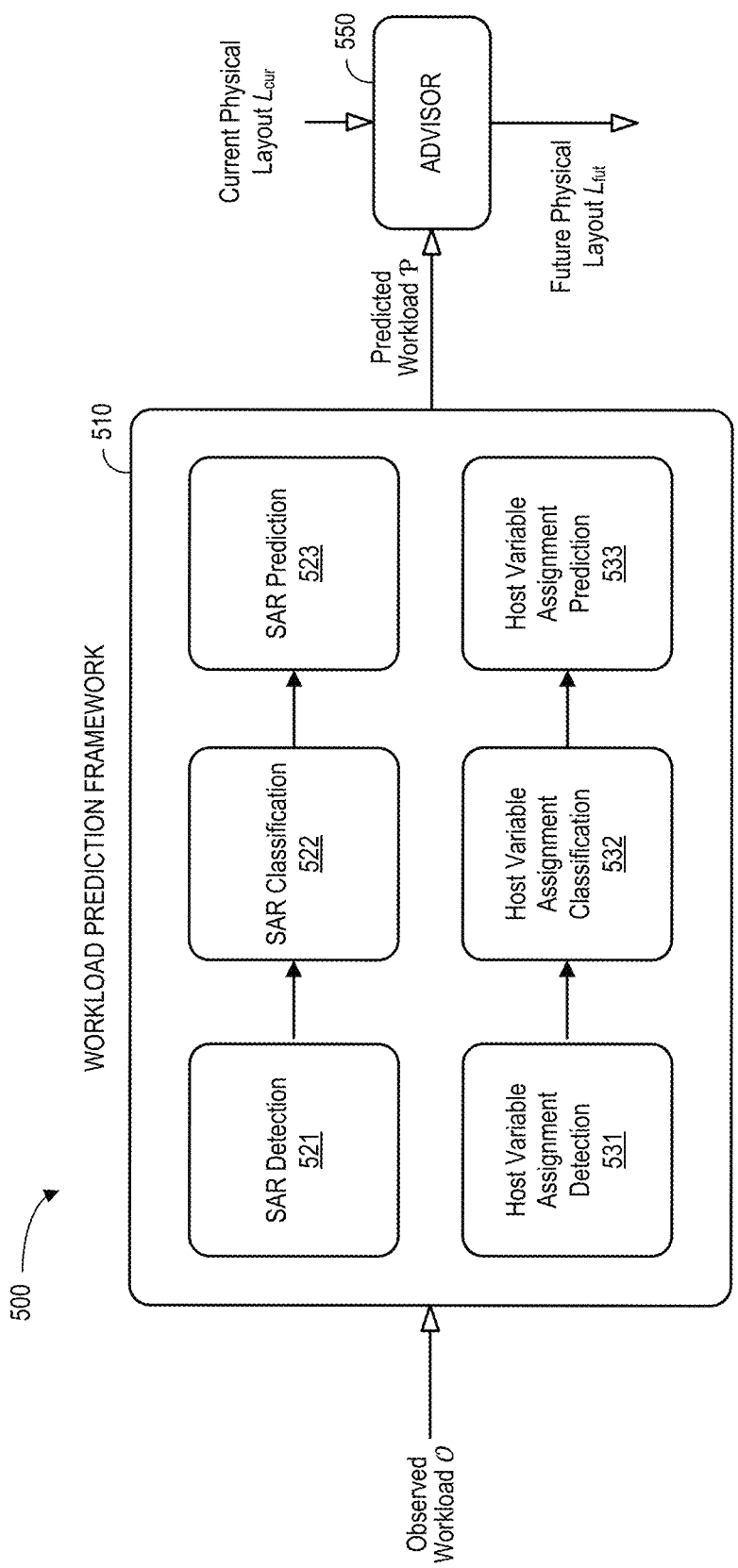
FIG. 5 illustrates a system according to some embodiments.

FIG. 5 is an overview of a system 500 according to some embodiments. It consists of a workload prediction framework 510 and a physical database design advisor 550. The workload prediction framework 510 predicts the future workload based on the observed workload on a per-statement basis. As it may be computationally infeasible to consider all statements in the observed workload for the prediction, some embodiments only utilize statements in the SQL plan cache because they typically represent more than 99% of the workload cost.

For each statement $q_i \in Q$, the future workload is predicted in two independent stages. In stage I, SAR detection 521, SAR classification 522, and SAR prediction 523 are used to predict the statement arrival rate. In stage II, host variable assignment detection 531, host variable assignment classification 532, and host variable assignment prediction 533 are used to predict the future assignments of parameter values to host variables. The predicted workload can then be obtained by combining the results of both stages. The advisor 550 uses this information along with information about a current physical layout to propose the future physical layout $L_{fut}$ with the smallest combined workload and data reorganization costs based on the predicted workload P and the current physical layout $L_{cur}$. According to some embodiments, the workload prediction framework 510 and advisor 550 periodically repeat these steps to adopt the physical layout in small and cheap adjustments.

Figure 6:
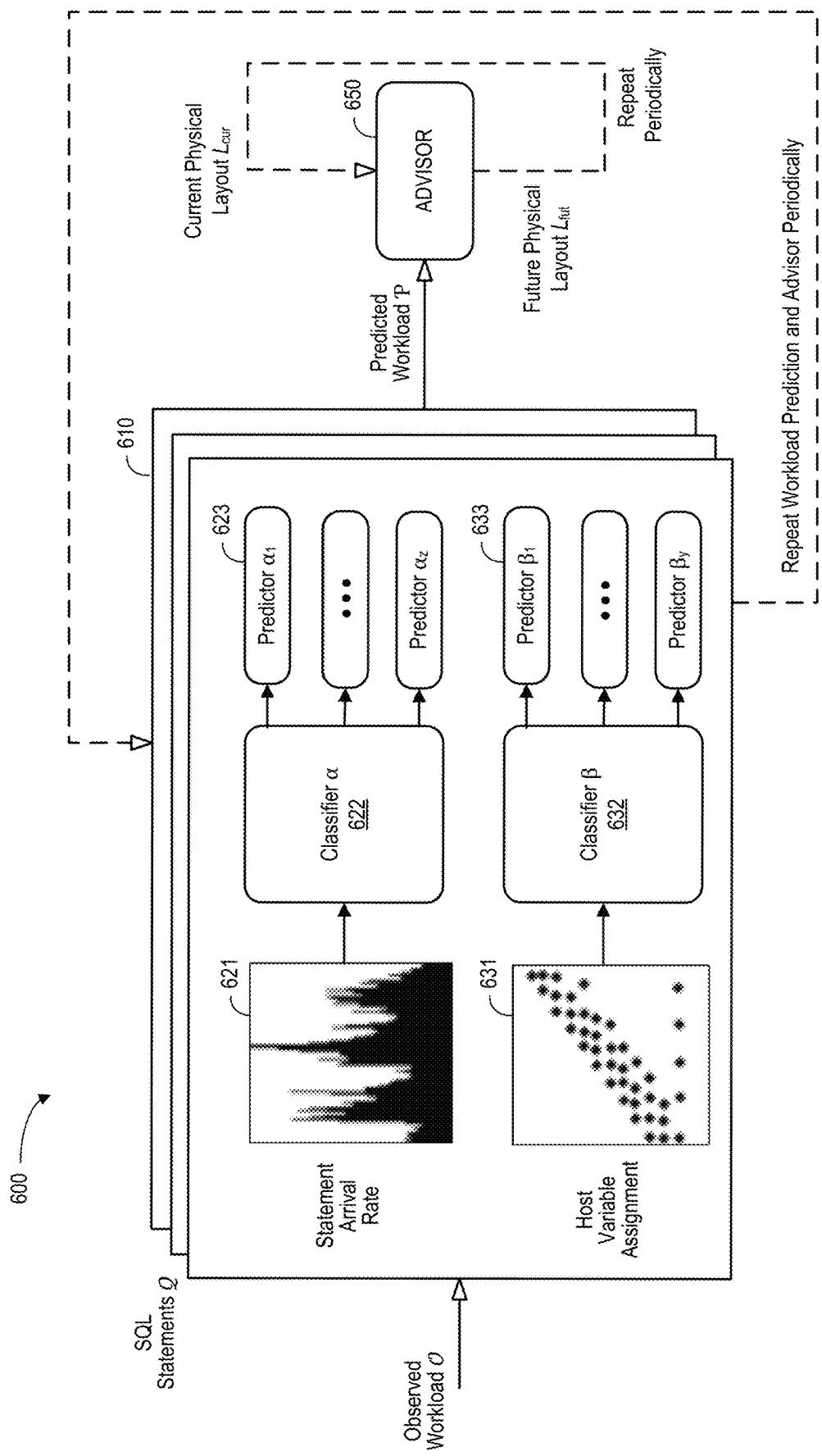
FIG. 6 is a more detailed system in accordance with some embodiments.

FIG. 6 is a more detailed system 600 in accordance with some embodiments. As before consists of a workload prediction framework 610 and a physical database design advisor 650. The workload prediction framework 610 predicts the future workload associated with SQL statements $Q$ based on the observed workload $\mathcal{O}$. For each statement $q_i \in Q$, the future workload is predicted based on a SAR prediction and a host variable assignment prediction. The SAR prediction utilizes SAR detection 621, SAR classification 622 (e.g., via classifier $\alpha$), and SAR prediction 623 (e.g., via predictors $\alpha_1$ through $\alpha_2$). The future assignments of parameter values to host variables utilizes host variable assignment detection 631, host variable assignment classification 632 (e.g., via classifier $\beta$), and host variable assignment prediction 633 (e.g., via predictors $\beta_1$ through $\beta_2$). The predicted workload P can then be obtained by combining the results of the SAR and host variable assignment predictions. The advisor 650 uses $\mathcal{P}$ along with information about the current physical layout $L_{cur}$ to propose the future physical layout $L_{fut}$ with the smallest combined workload and data reorganization costs. According to some embodiments, the workload prediction framework 610 and advisor 650 periodically repeat these steps to adopt the physical layout.

Note that workloads can vary over time in various different ways. For example, a real-world application workload might drift in a linear, exponential, reoccurring, static, or irregular fashion.

A linear or exponential workload drift is characterized by a linearly or exponentially increasing (or decreasing) arrival rate of statements, respectively parameter values assigned to host variables. For example, the parameter values of the domain of id_test_profile might grow linearly over time (e.g., as shown by the observed workload 111 in FIG. 1A). An exponential drift, for instance, might occur close to the release of a new version of a system (or the addition of a new feature to a system) when certain statements are instantiated exponentially more frequently than during regular development phases.

Figure 7:
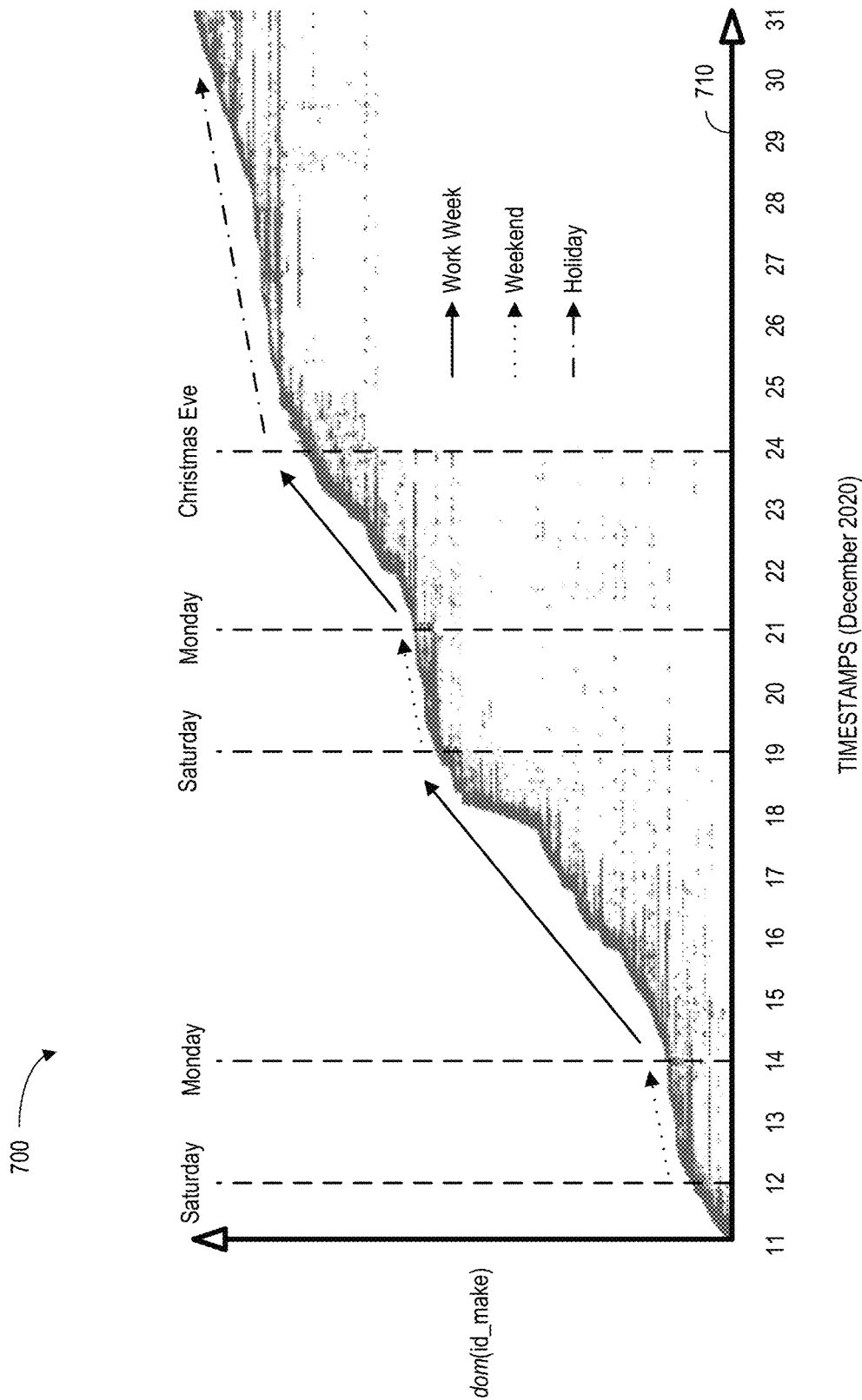
FIG. 7 is an example of workload drift according to some embodiments.

Since databases often interact with humans, workloads may follow reoccurring patterns. For example, to test a specific build, a test environment, called "install session," might be created on a dedicated test server using the SQL statement "INSERT INTO install sessions (id_make, id_server) VALUES (:1, :2)". FIG. 7 is an example 700 of workload drift instantiations of this statement between Dec. 11 and 31, 2020 at a certain time (x-axis on graph 710) using a specific build ID (y-axis). Two reoccurring drift patterns can be found. First, there is a weekly pattern, where a steep increase of id_make on weekdays alternates with much slighter increases on weekends. Second, there is an annual pattern, where id make increases more moderately around Christmas as compared to the rest of the month. Since id make follows two reoccurring patterns and grows linearly, FIG. 7 illustrates an example 700 of two overlapping drift types.

Figure 8:
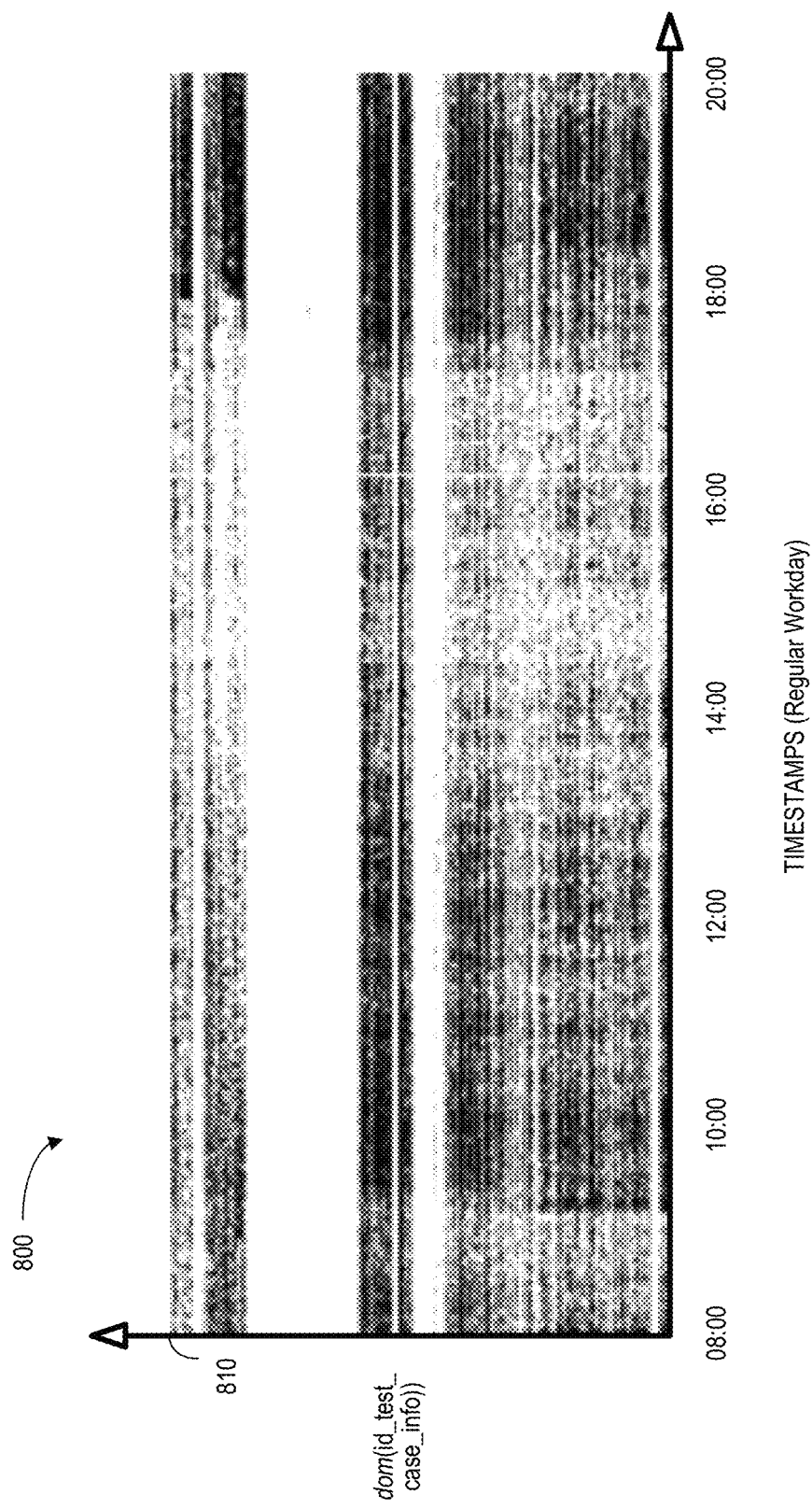
FIG. 8 illustrates a static workload in accordance with some embodiments.

A static workload is a workload where no temporal drift can be observed. For example, the dimension table test_case_info represents existing tests (e.g., their SQL string), and statement "SELECT id FROM test cases WHERE id_test_case_info=:1" returns all test case executions with the given test case ID from the fact table test cases. FIG. 8 illustrates 800 a static workload with a graph 810 that shows all instantiations of this statement between 08:00 and 20:00 on a regular workday. No change in the parameter values can be observed during the considered time frame. This might be expected, for example, when the same tests are repeatedly executed over an extended period of time to identify bugs or authorize patches.

An irregular workload drift is characterized by an abrupt and unexpected change of the statement arrival rate or the parameter values. For example, occasional stress test campaigns, in addition to regular testing, can lead to an irregular drift of the statement arrival rate. Unlike other drift types, irregular workload drifts can neither be modeled nor predicted. Nonetheless, some embodiments described herein may handle irregular workload drifts.

Figure 9:
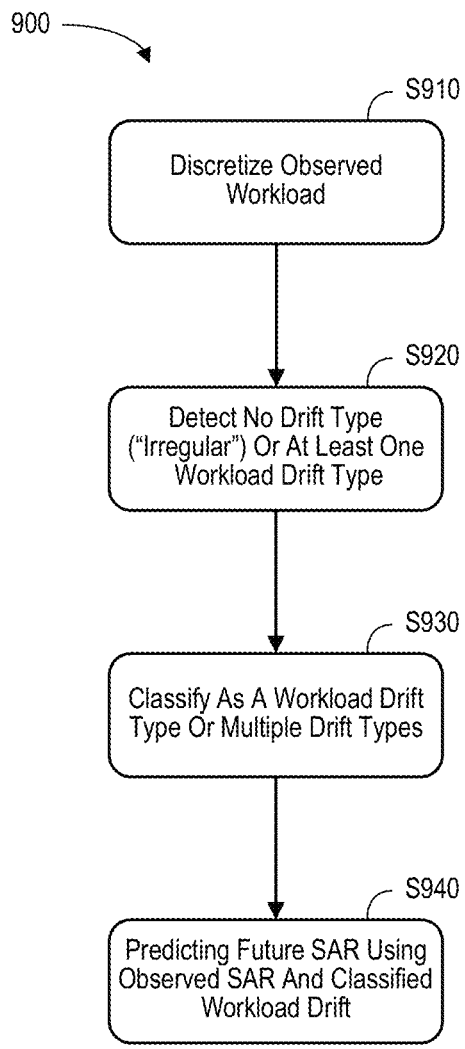
FIG. 9 is a SAR method in accordance with some embodiments.

FIG. 9 is a SAR prediction method 900 in accordance with some embodiments. S910 starts by discretizing the observed workload to reduce noise and other short-term fluctuations. For this purpose, a set of equidistant timestamps may be defined using a discretization interval $\delta \in \mathbb{N}_{>0}$ between two successive, discrete timestamps. By way of example, $\delta$ may be set to five minutes.

$\Delta(o_s, o_e)$ may be defined as a set of equidistant timestamps between the start and end timestamps $o_s, o_e \in \mathbb{N} :=$:

$$\Delta(o_s, o_e) \mathbb{N} : \{o_s + \lambda \cdot \delta | \lambda \in \mathbb{N}, o_s \leq o_s + \lambda \cdot \delta \leq o_e\}.$$

To calculate the observed statement arrival frequency, all statement instantiations in the observed workload $\mathcal{O}$ that fall within interval $[t, t+\delta)$ may be aggregated for a timestamp $t \in \Delta(o_s, o_e)$. The observed statement arrival frequency $F(t, \mathcal{O}, q_i)$ at timestamp $t \in \Delta(o_s, o_e)$ for statement $q_i \in Q$ in the observed workload may be defined as:

$$F(t, \mathcal{O}, q_i) := |\{t', q_i', v') \in \mathcal{O}, |q_i' \wedge t \leq t' < t+\delta\}|.$$

Finally, the observed statement arrival rate may be defined as a series of consecutive statement arrival frequencies between the start and end timestamps $o_s, o_e \in N$ in the observed workload $\mathcal{O}$,. The observed statement arrival rate (observed SAR) for statement $q_i \in Q$ in the observed workload $\mathcal{O}$, may be defined as:

$$SAR(\mathcal{O}, q_i) := \{(t, F(t, \mathcal{O}, q_i)) | t \in \Delta(o_s, o_e)\}.$$

Figure 10B:
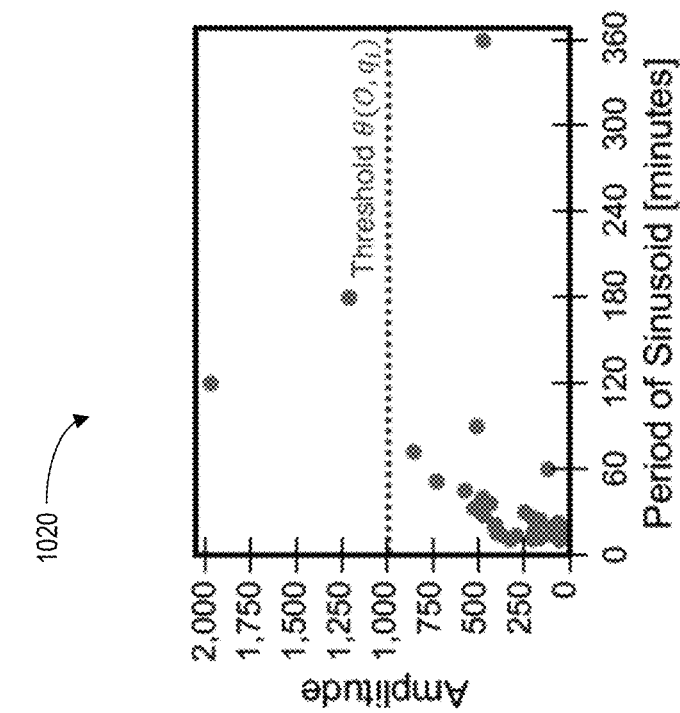
FIGS. 10A and 10B illustrate the relationship between SAR and a discrete Fourier transform of an observed SAR according to some embodiments.
Figure 10A:
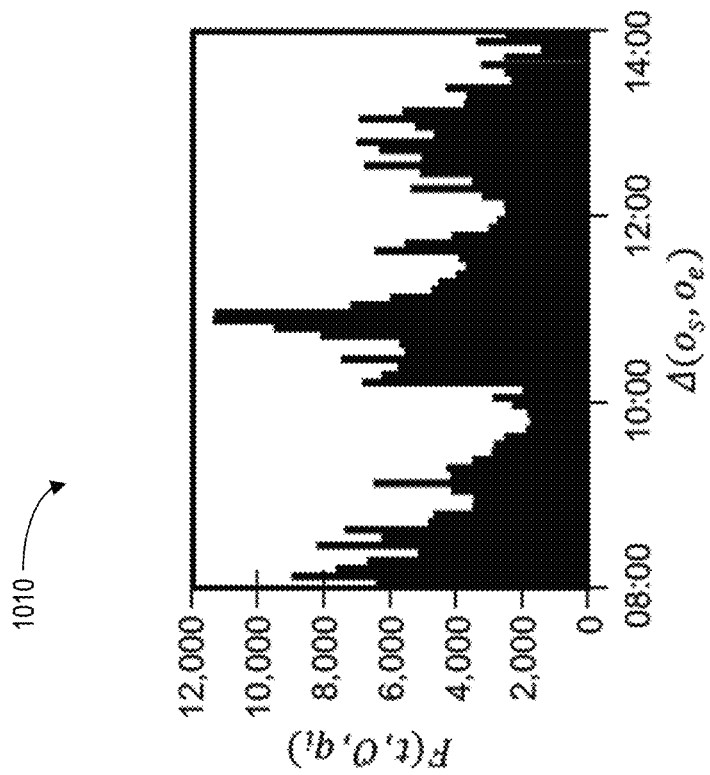
Figure 11A:
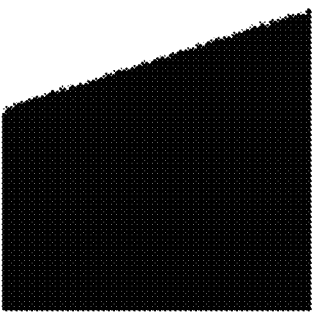
Figure 11C:
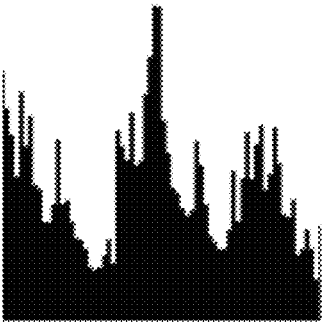
Figure 11D:
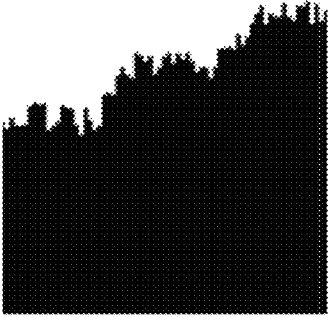

FIGS. 10A and 10B illustrate the relationship between SAR and a discrete Fourier transform of an observed SAR according to some embodiments. In particular, FIG. 10A shows 1010 the observed SAR $(\mathcal{O}, q_i)$ for equidistant timestamps between 08:00 and 14:00 with a discretization interval $\delta$ of five minutes, calculated from the observed workload 111 of FIG. 1A. Note there is a wavelike pattern with peaks at 08:30, 11:00, and 13:00.

Referring again to FIG. 9, at S920 the system may detect which workload drift types are present in the observed SAR. According to some embodiments, a condition-based detector may be used in connection with the observed SAR for each drift type. To detect a linear workload drift, embodiments may use the Pearson correlation between the series of discrete timestamps and the series of statement arrival frequencies (both series being abbreviated as $SAR(\mathcal{O}, q_i)$).

The condition is satisfied if the Pearson correlation coefficient $\rho$ is greater or equal than a threshold $\varphi_{lin} \in [0, 1]$:

$$SAR(\mathcal{O}, q_i) \text{ is linear} \Leftrightarrow |\rho(SAR(\mathcal{O}, q_i))| \geq \varphi_{lin}.$$

To detect exponential workload drifts, embodiments may take advantage of the fact that a function grows exponentially if its logarithm grows linearly. Therefore, the condition is satisfied if the Pearson correlation coefficient $\rho$ between the series of discrete timestamps and the series of the logarithm of each statement arrival frequency is greater or equal than a threshold $\varphi_{exp} \in [0, 1]$ (note that the logarithm is only applied on the series of statement arrival frequencies $F(t, \mathcal{O}, q_i)$ in $SAR(\mathcal{O}, q_i)$ and not on the series of discrete timestamps):

$$SAR(\mathcal{O}, q_i) \text{ is exponential} \Leftrightarrow |\rho(\log(SAR(\mathcal{O}, q_i)))| \geq \varphi_{exp}.$$

To detect a reoccurring workload drift, embodiments may first compute the Discrete Fourier Transform ("DFT"), i.e., convert the observed SAR from the time domain into the frequency domain. Afterwards, the system may evaluate whether a sinusoid with an amplitude greater or equal than a threshold $\theta(\mathcal{O}, q_i)$ is present in the DFT. To specify the threshold $\theta(\mathcal{O}, q_i)$, embodiments may first determine the smallest and largest observed statement arrival frequencies $lb_i$ and $ub_i$ of statement $q_i$ in the observed workload. Given a fixed $\varphi_{cyc} \in [0,1]$, the threshold $\theta(\mathcal{O}, q_i)$ is obtained as $\varphi_{cyc}$ times the largest possible amplitude range but at least $\varphi_{cyc}$ times the smallest statement arrival frequency.

$$ub_i := \max_{t \in \Delta(o_s, o_e)} F(t, \mathcal{O}, q_i)$$

$$lb_i := \min_{t \in \Delta(o_s, o_e)} F(t, \mathcal{O}, q_i)$$

$$\theta(\mathcal{O}, q_i) := \varphi_{cyc} \cdot \max(ub_i - lb_i, lb_i)$$

$$SAR(\mathcal{O}, q_i) \text{ is reoccurring} \Leftrightarrow \exists \, z \in DFT(SAR(\mathcal{O}, q_i)) : |z| \geq \theta(\mathcal{O}, q_i).$$

FIG. 10B shows 1020 the Discrete Fourier Transform DFT (SAR $(\mathcal{O}, q_i)$ as a graph mapping the amplitude to the period of sinusoid (in minutes). Each dot represents a sinusoid with a certain period (x-axis) and amplitude (y-axis). Also depicted is a threshold $\theta(\mathcal{O}, q_i)$ calculated using the smallest (1498) and largest (11491) statement arrival frequencies and $\varphi_{cyc}$=0.1. As can be seen, the amplitudes of two sinusoids with periods of 120 and 180 minutes exceed the threshold, which constitutes a reoccurring drift.

In order to identify static workloads, embodiments may examine whether the observed SAR is stable, i.e., it fluctuates only within narrow limits around the mean statement arrival frequency $\mu_i$. Given a fixed $\varphi_{static} \in [0,1]$, the condition is satisfied if Root Mean Square Error ("RMSE") between the observed statement arrival frequencies and $\mu_i$ is less than or equal to $\varphi_{static}$ times $\mu_i$:

$$\mu_i := \frac{\sum_{t \in \Delta(o_s, o_e)} F(t, O, q_i)}{|\Delta(o_s, o_e)|}$$

$$RMSE(SAR(O, q_i)) := \sqrt{\frac{\sum_{(t, F(t, O, q_i)) \in SAR(O, q_i)} (F(t, O, q_i) - \mu_i)^2}{|\Delta(o_s, o_e)|}}$$

$$SAR(O, q_i) \text{ is static} \Leftrightarrow RMSE(SAR(O, q_i)) \leq \varphi_{static} \cdot \mu_i.$$

Since irregular workload drifts are, by definition, abrupt and unexpected, a traditional condition might not be useful to handle these types of drifts. According to some embodiments, a workload is classified as irregular if none of the above conditions for linear, exponential, reoccurring, or static drifts are met. Note that embodiments described herein are extensible such that other conditions could be plugged in to detect an irregular drift.

To demonstrate how workload drifts can be detected using the above conditions, FIGS. 11A through 11F show six SQL statements ($q_1$ through $q_6$) the observed SAR and whether the conditions are satisfied (✓) or not (✗). Due to space constraints, only the sinusoid with the largest amplitude in the condition for a reoccurring drift is presented in these figures. The following parameters were used: $\varphi_{lin}=0.8$, $\varphi_{exp}=0.8$, $\varphi_{cyc}=0.1$, and $\varphi_{static}=0.1$. Note that in some cases multiple drift types are detected, e.g., in FIG. 11B an exponential and a reoccurring drift is detected.

Figure 12:
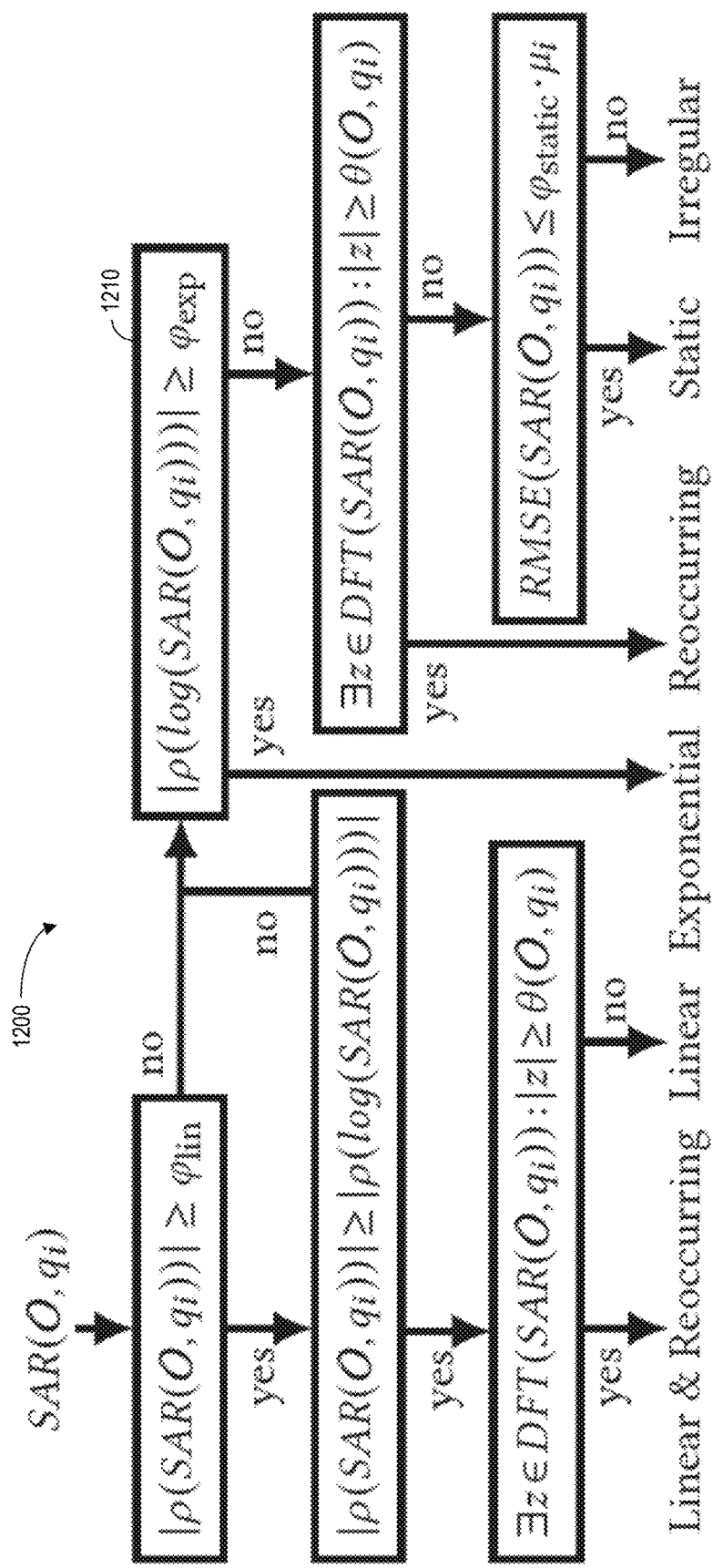
FIG. 12 is a Directed Acyclic Graph ("DAG") classifier to determine workload drift type according to some embodiments.

Referring again to FIG. 9, at S930 conflicts between multiple detected workload drift types may be resolved such that the observed SAR is classified as one drift type or a combination of different drift types that are compatible with each other. FIG. 12 is a Directed Acyclic Graph ("DAG") classifier 1200 that uses decisions 1210 determines workload drift type according to some embodiments.

If exactly one drift type is detected, the classifier 1200 decides that the observed SAR is the detected drift type. If two or more drift types are detected, the classifier distinguishes compatible and incompatible drift combinations. According to some embodiments, the combination of linear and reoccurring is considered compatible (e.g., FIG. 7 and $q_4$ in FIG. 11D). In contrast, since an exponential drift asymptotically subsumes a linear drift, both together are an incompatible combination. In this case, the classifier 1200 prefers the drift type with the stronger Pearson correlation coefficient ρ. Further, an exponential drift is preferred over a reoccurring drift because the exponential drift may appear as a sinusoid in the DFT (e.g., $q_2$ in FIG. 11B).

Table II shows classification outcomes and the predicted statement arrival frequencies at future discrete timestamps $t \in \Delta(f_s, f_e)$ for the six SQL statements shown in FIGS. 11A through 11F. Because of a 6-hour observation window and a choice of 5 minutes as discretization interval δ, the timestamps of $\mathcal{O}$ range between 0 and 71, while timestamps of $\mathcal{P}$ begin at 72. If none of the conditions are satisfied, the classifier 1200 decides that the observed SAR is irregular.

TABLE II

Classification Outcomes

| $\mathcal{Q}$ | Classification | Predicted Statement Arrival Frequency |
| --- | --- | --- |
| $q_1$ | Linear | $F(t, \mathcal{P}, q_1) = 13t + 7071$ |
| $q_2$ | Exponential | $F(t, \mathcal{P}, q_2) = e^{0.09t+1.41}$ |
| $q_3$ | Reoccurring | $F(t, \mathcal{P}, q_3) = 1216\cos(2\pi t) + 18\sin(2\pi t) - 1004\cos(2\pi t) - 1701\sin(2\pi t) + 4954$ |
| $q_4$ | Linear and Reoccurring | $F(t, \mathcal{P}, q_4) = 61t + 5801 + 185\cos(2\pi t) + 135\sin(2\pi t) - 239\cos(2\pi t) - 317\sin(2\pi t)$ |
| $q_5$ | Static | $F(t, \mathcal{P}, q_5) = 10690$ |
| $q_6$ | Irregular | $F(t, \mathcal{P}, q_6) = F(t \bmod 72, \mathcal{O}, q_6)$ |

Referring again to FIG. 9, at S940 the system may predict the future SAR using the observed SAR and the outcome of the prior classification. To do this, the system may calculate the predicted statement arrival frequency $F(t, \mathcal{P}, q_i)$ at future timestamps $t \in \Delta(f_s, f_e)$ for each statement $q_i \in \mathcal{Q}$. The predicted $SAR(\mathcal{P}, q_i)$ is then obtained as the series of consecutive statement arrival frequencies between $f_s$ and $f_e$. According to some embodiments, the prediction is based on the classification of the observed SAR:

Linear: Use a linear approximation function obtained by ordinary least-squares regression on the observed SAR.

Exponential: First perform ordinary least-squares regression on the natural logarithm of the observed SAR. The future SAR is calculated by raising e to the power of the prediction produced by the linear approximation function.

Reoccurring: Convert all sinusoids with an amplitude greater or equal than threshold $\theta(\mathcal{O}, q_i)$ into a sum of trigonometric functions in the time domain.

Static: Use the mean observed statement arrival frequency $\mu_i$ as a prediction of future statement arrival frequencies.

Irregular: We copy the observed SAR and paste it into the future, similar to a backward-looking approach.

Linear and reoccurring: Compute a sum of a linear function and trigonometric functions. The linear function is obtained by ordinary least-squares regression on the observed SAR. Then calculate a normalized observed SAR by subtracting the linear function from the observed SAR. Finally, obtain the trigonometric functions by transforming all sinusoids in the DFT of the normalized SAR with an amplitude greater or equal than threshold $\theta(\mathcal{O}, q_i)$.

Sinusoids with a small amplitude may be filtered out when handling a reoccurring drift because they may result from short-term fluctuations or noise and would therefore lead to overfitting. Since irregular drifts can neither be modeled nor predicted, the framework cannot know the future. Instead, the system may copy the observed SAR into the future (e.g., a backward-looking approach). Because the overhead of the approach is relatively low, the system can run the workload predictor and the advisor periodically (so that it responds timely to the outcome of an irregular drift).

Figure 13:
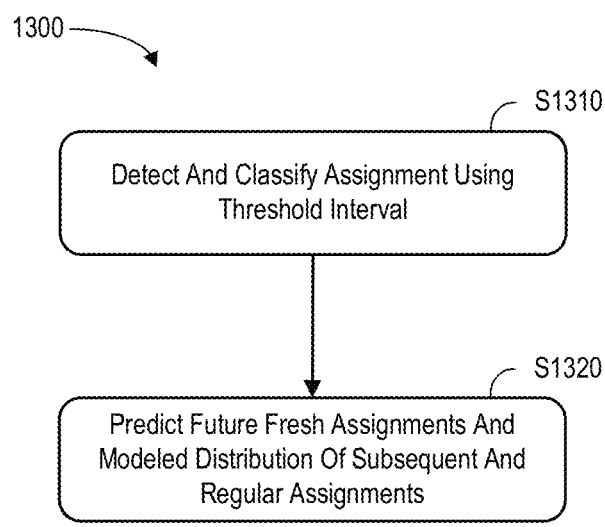
FIG. 13 is a host variable assignment method according to some embodiments.

FIG. 13 is a host variable assignment method 1300 according to some embodiments to predict the future assignments of parameter values to host variables. For pragmatic reasons, note that the system may predict the assignments to a host variable independently of other host variables. To illustrate the main idea of this method 1300, consider the graph 1410 FIG. 14A, which is an abstract representation of the observed workload in FIG. 1A. Each dot represents a single assignment $(t, v_{ij}) \in \mathcal{A}(\mathcal{O}, h_{ij})$ of parameter value $v_{ij}$ (y-axis) to host variable $h_{ij}$ at timestamp t (x-axis). For now, it is sufficient to understand that an assignment is classified as "uncertain" if it occurs close to the beginning of the observation period, as "regular" if $v_{ij}$ is regularly assigned to $h_{ij}$ (e.g., those assignments are time independent because they occur so often that no periodic/reoccurring pattern can be observed and, therefore, they belong to a static workload), as "fresh" if $v_{ij}$ has not been assigned yet to $h_{ij}$ within a recent time interval, and as "subsequent" otherwise. Furthermore, note that subsequent assignments frequently occur shortly after fresh assignments (and rarely further on). Finally, the regular assignments are distributed across the entire observed workload.

Referring again to FIG. 13, at S1310 the system may perform detection and classification. In order to classify an assignment $(t, v_{ij}) \in \mathcal{A}(\mathcal{O}, h_{ij})$, a threshold interval of length k·δ may be selected, with $k \in \mathbb{N}_{>0}$, as a multiple of the discretization interval $\delta \in \mathbb{N}_{>0}$. According to some embodiments, the threshold interval k·δ is used to distinguish time-dependent and time-independent assignments. Given a threshold interval of length k·δ, an assignment $(t, v_{ij}) \in \mathcal{A}(\mathcal{O}, h_{ij})$ is classified as:

UNCERTAIN if $o_s \leq t < o_s + k \cdot \delta$

REGULAR else if $\forall i \in [o_s, o_e - k \cdot \delta] \exists (t', v_{ij}) \in \mathcal{A}(\mathcal{O}, h_{ij}) : i \leq i + k \cdot \delta$ FRESH else if $\nexists (t', v_{ij}) \in \mathcal{A}(\mathcal{O}, h_{ij}) : t - k \cdot \delta \leq t' < t$ SUBSEQUENT else.

Assignments, where the same parameter value is assigned to the same host variable at least once every k·δ time units, are independent of the time and thus part of the static workload. Such assignments are classified as regular. For example, in FIG. 14A this is the case for parameter value v'$_{ij}$. In contrast, the absence of a repeated assignment of a parameter value every k·δ time units implies that the assignment is time-dependent and thus part of the workload drift. If the parameter value in such assignments is first assigned after k·δ time units, the assignment is classified as fresh, otherwise (second, third, etc.) as subsequent. For example, in FIG. 14A the assignment of v''$_{ij}$ at timestamp t is fresh as v'$_{ij}$ was not assigned in the previous k·δ time units, whereas later assignments of v'$_{ij}$ are subsequent. Finally, assignments in the interval [$o_s$, $o_s + k \cdot \delta$) are classified as uncertain because the system cannot exclude the possibility that fresh assignments in this interval are actually subsequent assignments that follow fresh assignments before $o_s$.

Figure 14A:
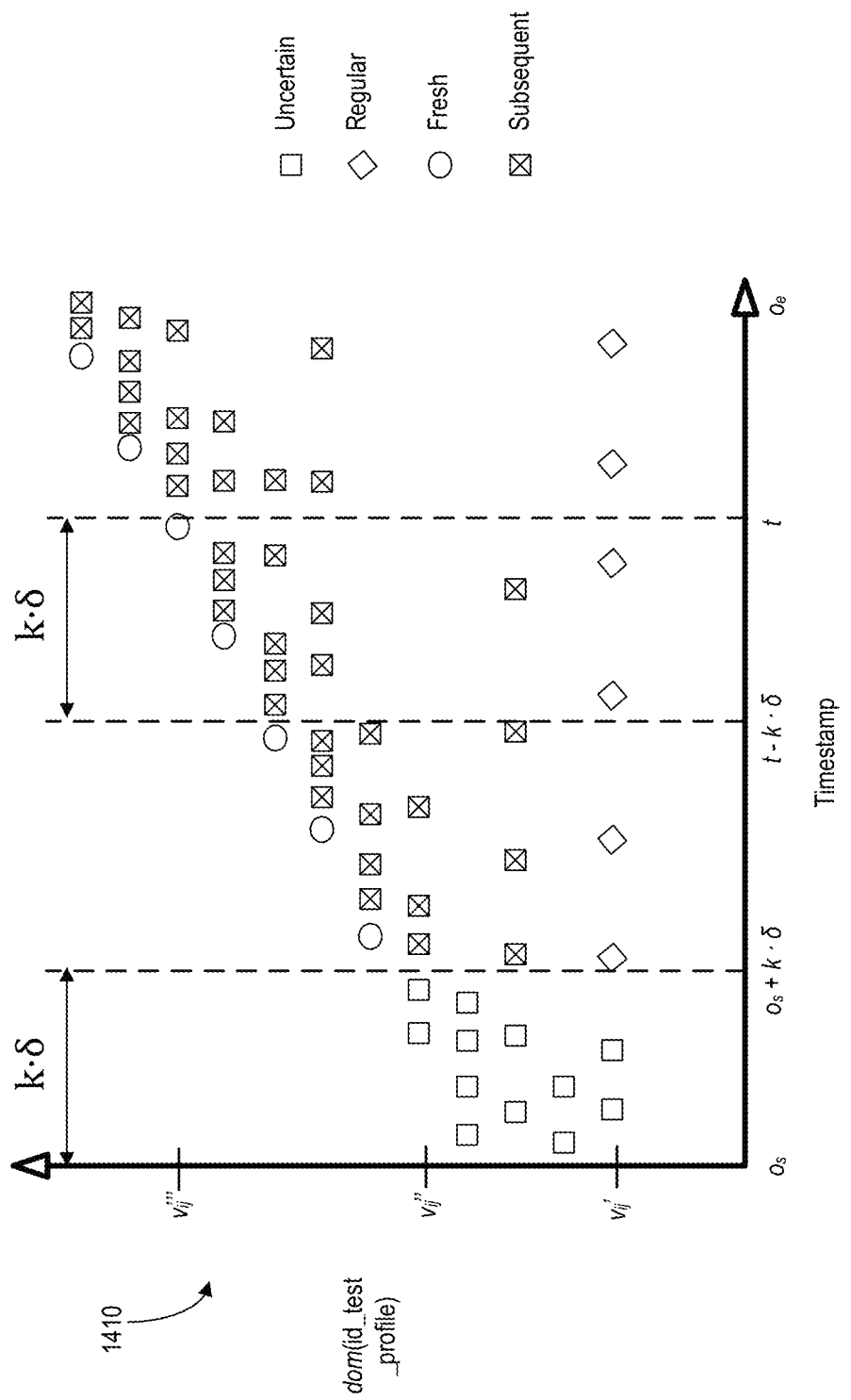
FIGS. 14A and 14B illustrates the classification of assignments in accordance with some embodiments.
Figure 14B:
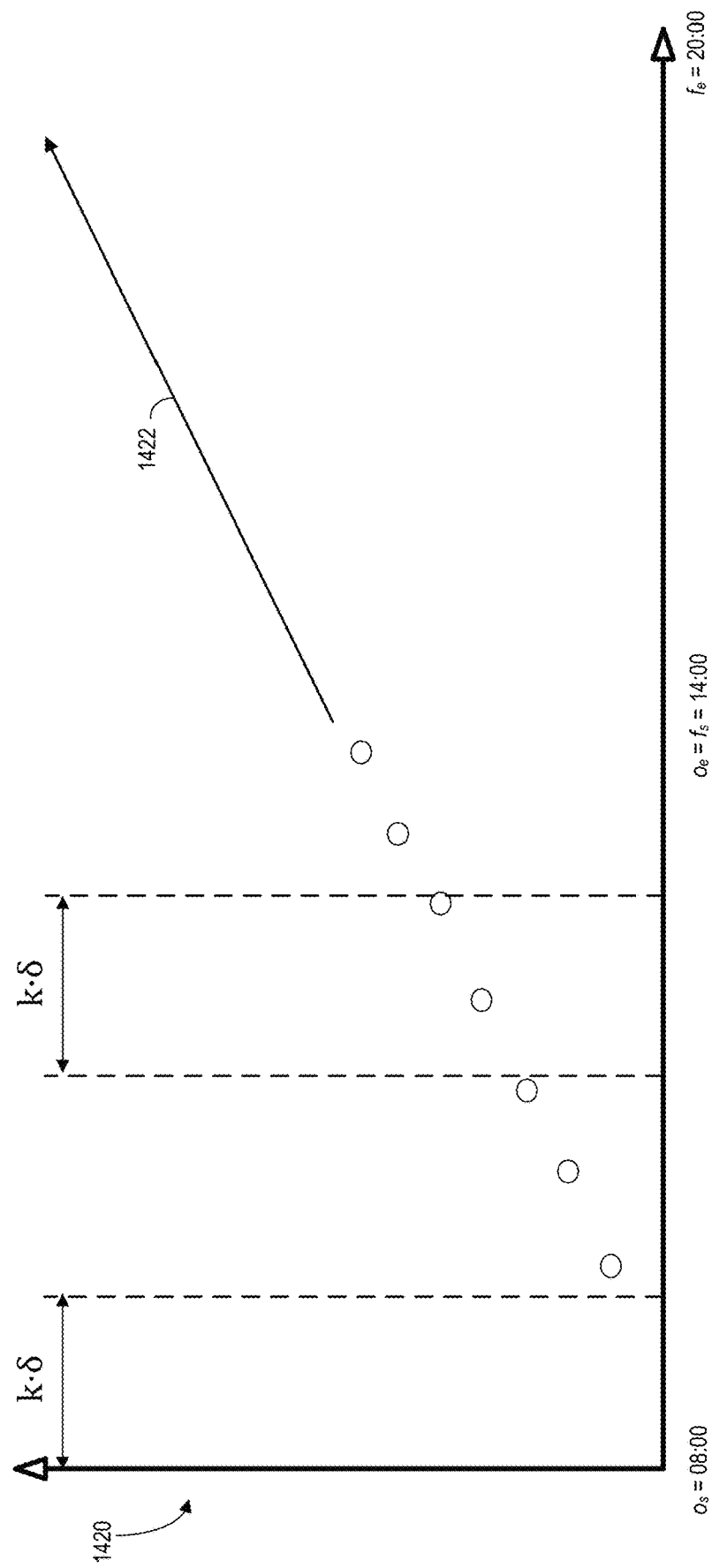

At S1320, the system predicts the future fresh assignments and models the distribution of subsequent and regular assignments. For fresh assignments, the system may extrapolate the series of fresh assignments in the observed workload into the future and thereby predict the series of future fresh assignments. For example, FIG. 14B is a graph 1420 shows fresh assignments with a linear characteristic that can be extrapolated into future predictions 1422 (e.g., from $f_s$=14:00 to $f_e$=20:00).

The observed series of Fresh Assignments (observed "SFA") of host variable h$_{ij}$ in the observed workload $\mathcal{O}$ may be defined as the set of all fresh assignments in $\mathcal{A}(\mathcal{O}, h_{i1})$:

SFA($\mathcal{O}, h_{ij}$):= {$(t, v_{ij}) | (t, v_{ij}) \in \mathcal{A}(\mathcal{O}, h_{ij}), (t, v_{ij})$ is fresh}.

As before, the system may detect which drift types are present in the observed SFA and then use a classifier (such as the one in FIG. 12) to resolve conflicts between multiple detected drift types. For example, the observed SFA in FIG. 14A is classified as linear (as can be seen in FIG. 14B). The system can then predict the future series of fresh assignments SFA($\mathcal{P}, h_{ij}$) based on SFA ($\mathcal{O}, h_{ij}$) and the outcome of the prior classification.

The system may model the distribution of subsequent assignments of parameter values in relation to their corresponding fresh assignments. This model can then be used to predict future subsequent assignments in relation to their predicted fresh assignments. To do this, first formalize the time difference between a subsequent assignment and its corresponding fresh assignment as the temporal offset between the two. Let $\mathcal{A}_{sub}(\mathcal{O}, h_{ij})$ be the set of subsequent assignments to host variable h$_{ij}$ in the observed workload $\mathcal{O}$. The time difference $\tau(t, v_{ij})$ between a subsequent assignment $(t, v_{ij}) \in \mathcal{A}_{sub}$ and its corresponding fresh assignment is defined as:

$\tau(t, v_{ij}) = \min(\{t - v_{ij}) \in \mathcal{A}(\mathcal{O}, h_{ij}), (t', v_{ij})$ is fresh, $t' < t\})$.

Note that for the same parameter value, more than one fresh assignment can exist. This may happen, for example, with a reoccurring drift. To handle such ambiguities, some embodiments only consider the temporal offset to the most recent corresponding fresh assignment.

Another special case is when no fresh assignment exists for a subsequent assignment because the fresh assignment occurred at the beginning of the observed workload and was classified as uncertain. For example, in FIG. 14A this happens for v''$_{ij}$. In such cases, the system may estimate a fresh assignment by extrapolating the observed SFA into the past.

A probability mass function may be built that models the probability of time differences between a subsequent assignment and its corresponding fresh assignment. Some embodiments model the time difference in terms of time intervals $I(\lambda) = [\lambda \cdot \delta, (\lambda+1) \cdot \delta), \lambda \in \mathbb{N}$. Some embodiments use δ as the interval length only for the pragmatic reason that the observed workload has been discretized in steps of length δ. According to some embodiments, a probability mass function $p_{sub}$ is defined as the probability that the time difference $\tau(t, v_{ij})$ between a subsequent assignment of parameter value $v_{ij}$ to host variable h$_{ij}$ and its corresponding fresh assignment falls into interval $I(\lambda)$:

$$p_{sub}(h_{ij}, \lambda) = \frac{|\{(t, v_{ij}) | (t, v_{ij}) \in \mathcal{A}_{sub}(\mathcal{O}, h_{ij}), \tau(t, v_{ij}) \in I(\lambda)\}|}{\mathcal{A}_{sub}(\mathcal{O}, h_{ij})}.$$

Figure 15:
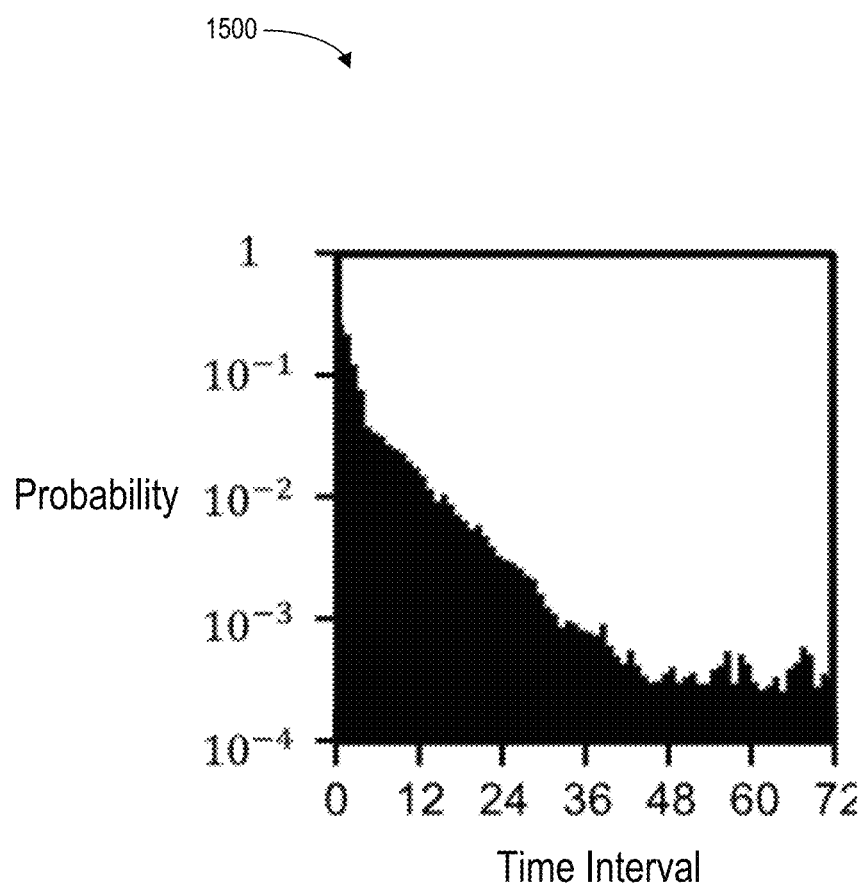
FIG. 15 is a probability mass function according to some embodiments.

FIG. 15 is a probability mass function 1500 (with the y-axis shown in log scale) according to some embodiments. The function 1500 shows the probability mass function $p_{sub}$ for the observed workload of FIG. 1A. Observe that the larger time differences between fresh and subsequent assignments are associated with smaller probabilities. Note that x-axis show time intervals $I(\lambda)$ for λs between 0 and 72.

Finally, some embodiments may model the distribution of regular assignments in terms of a probability mass function. Using such a model, the system can then predict future regular assignments. Let $\mathcal{A}_{reg}$ be the set of regular assignments to host variable h$_{ij}$ in the observed workload $\mathcal{O}$. Define a probability mass function $p_{reg}$ as the probability of a regular assignment of parameter value IN to host variable h$_{ij}$:

$$p_{reg}(h_{ij}, v_{ij}) = \frac{|\{(t, v_{ij}) | (t, v_{ij}) \in \mathcal{A}_{reg}(\mathcal{O}, h_{ij})\}|}{\mathcal{A}_{reg}(\mathcal{O}, h_{ij})}.$$

The prediction is based on the following two assumptions: first, regular assignments to a host variable in the observed workload will continue in the future workload; and second, regular assignments are uniformly distributed. To motivate both assumptions, consider FIG. 1A where parameter values of id_test_profile between 72,154,000 and 72,159,000 belong to background jobs which check the flakiness of tests. The goal of these jobs is to ensure that all tests are stable and produce deterministic results. Note that both $p_{sub}$ and $p_{reg}$ are just examples of such probability mass functions. Both can be exchanged with any other probability distribution.

Table III contains an algorithm that can be used to compute a predicted workload P. The algorithm expects as input for each SQL statement $q_i \in \mathcal{Q}$ the predicted statement arrival rate SAR($\mathcal{P}, q_i$), and for each host variable h$_{ij}$ in statement $q_i$ the predicted series of fresh assignments SFA (h$_{ij}$) and the probability mass functions $p_{sub}(h_{ij}, \lambda)$ and $P_{reg}$ (h$_{ij}$, $v_{ij}$).

TABLE III

Workload Prediction Algorithm

Input: For each statement $q_i \in Q$: SAR(P, $q_i$)
       For each host variable $h_{ij}$ in $q_i$: SFA(P, $h_{ij}$), $p_{sub}$, $p_{reg}$

```
1    P := { }  // initialize the predicted workload
2    for 1 ≤ i ≤ n do  // iterate over indexes of SQL statements
3      for t ∈ Δ(f_s, f_e) do  // iterate over future equidistant timestamps
4        F(t, P, q_i) := SAR(P, q_i) [t]  // get statement arrival frequency
5        for 1 . . . F (t, P, q_i) do// iterate over statement instantiations
6          draw a random timestamp t_rand ∈ [t, t + δ)  // uniform
7          allocate vector v_i with a capacity of m_i parameter values
8          for 1 ≤ j ≤ m_i do  // iterate over indexes of host variables
9            draw assignment category fresh, subsequent, or regular according to
             their distribution in A(O, h_ij)
10           switch assignment category do
11             case fresh do  // generate fresh assignment
12               v_ij:= SFA(P, h_ij) [t_rand]  // get value from SFA at t_rand
13             case subsequent do  // generate subsequent assignment
14               draw an interval [λ · δ, (λ + 1) · δ) according to p_sub
15               draw a random time difference t_diff ∈ [λ · δ, (λ + 1) · δ)
16               t_fresh := t_rand - t_diff //calculate time of fresh assignment
17               v_ij: = SFA(P, h_ij) [t_fresh]  // get value from SFA at t_fresh
18             case regular do  // generate regular assignment
19               v_ij:= draw parameter value according to p_reg
20           insert parameter value v_ij into vector v_i
21       P = P ∪ {(t_rand, qi, vi)}  // add predicted statement instantiation to P
```

The algorithm first initializes P as an empty set (line 1). Next, the algorithm iterates over all SQL statements $q_i \in Q$ (line 2) and all future equidistant timestamps $t \in \Delta(f_s, f_e)$ (line 3). The system then derives the number of statement instantiations $F(t, P, q_i)$ to be predicted in the current interval $[t, t+\delta)$ from the predicted SAR, where SAR(P, $q_i$)[t] denotes the statement arrival frequency at timestamp t (line 4). For each statement instantiation to predict, the algorithm draws a random timestamp $t_{rand}$ uniformly from $[t, t+\delta)$ (lines 5 and 6) and allocates a vector v with a capacity of $m_i$ parameter values (line 7). Finally, the system iterates over all host variables $h_{ij}$ to predict their assignment by parameter values IN (lines 8 to 20) and adds the predicted statement instantiation ($t_{rand}$, $q_1$, $v_i$) to the predicted workload P (line 21).

Some embodiments assume that the distribution of fresh, subsequent, and regular assignments in the observed and future workloads are identical. Therefore, to predict the future parameter value $v_{ij}$ of a host variable $h_{ij}$ at timestamp $t_{rand}$, the system may first draw an assignment category fresh, subsequent, or regular with the same probabilities as they occur in $A(O, h_{ij})$ (line 9). For example, the probability of generating a subsequent assignment is $|A_{sub}(O, h_{ij})|/(|A(O, h_{ij})|-A_{unc}|A(O, h_{ij})|)$, where $A_{sub}$ (resp. $A_{unc}$) denotes the set of subsequent (resp. uncertain) assignments to host variable $h_{ij}$ in $O$..

The prediction of parameter value $v_{ij}$ of host variable $h_{ij}$ at timestamp $t_{rand}$ depends on which assignment category is drawn:

Fresh: generate a fresh assignment with parameter value $v_{ij}$ set to the value of the predicted series of fresh assignments SFA(P, , $h_{ij}$) at timestamp $t_{rand}$ (line 12).

Subsequent: The timestamp and parameter value of subsequent assignments are modeled in terms of their corresponding fresh assignments. Generate a subsequent assignment in two steps: In a first step, draw a time difference $t_{diff}$ between the subsequent assignment to generate at timestamp $t_{rand}$ and its corresponding fresh assignment at $t_{fresh}$. More specifically, draw an interval [λ·δ, (λ+1)·δ) according to the probability given by $p_{sub}$ (line 14), then draw $t_{diff}$ uniformly from this interval (line 15), and calculate $t_{fresh}$ as difference between $t_{rand}$ and $t_{diff}$ (line 16). In a second step, generate a subsequent assignment with parameter value $v_{ij}$ set to the value of the predicted series of fresh assignments SFA(P, , $h_{ij}$) at $t_{fresh}$ (line 17).

Regular: Generate a regular assignment with parameter value $v_{ij}$ drawn according to the probability given by $p_{reg}$ (line 19).

Figure 16A:
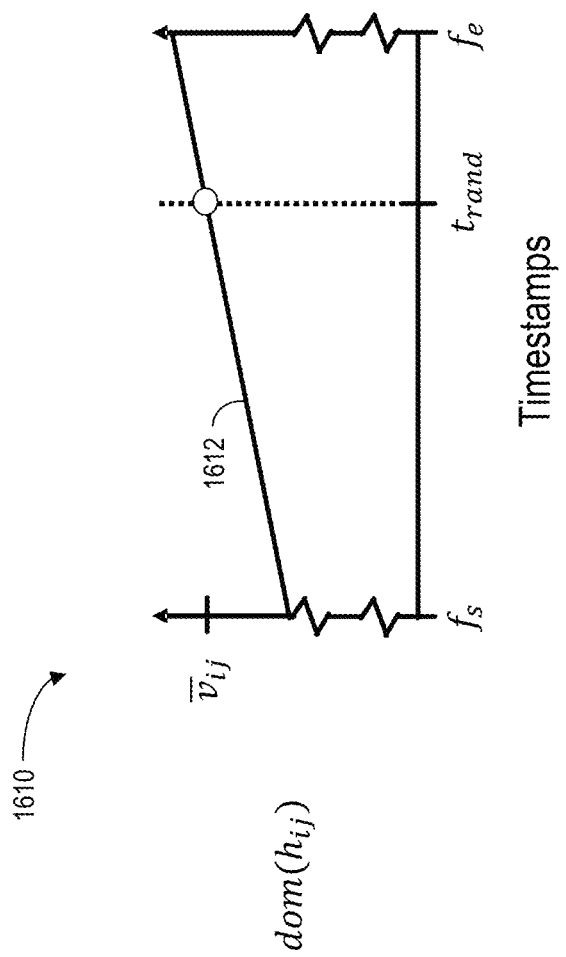
FIGS. 16A through 16C are examples for the prediction of assignments in accordance with some embodiments.
Figure 16B:
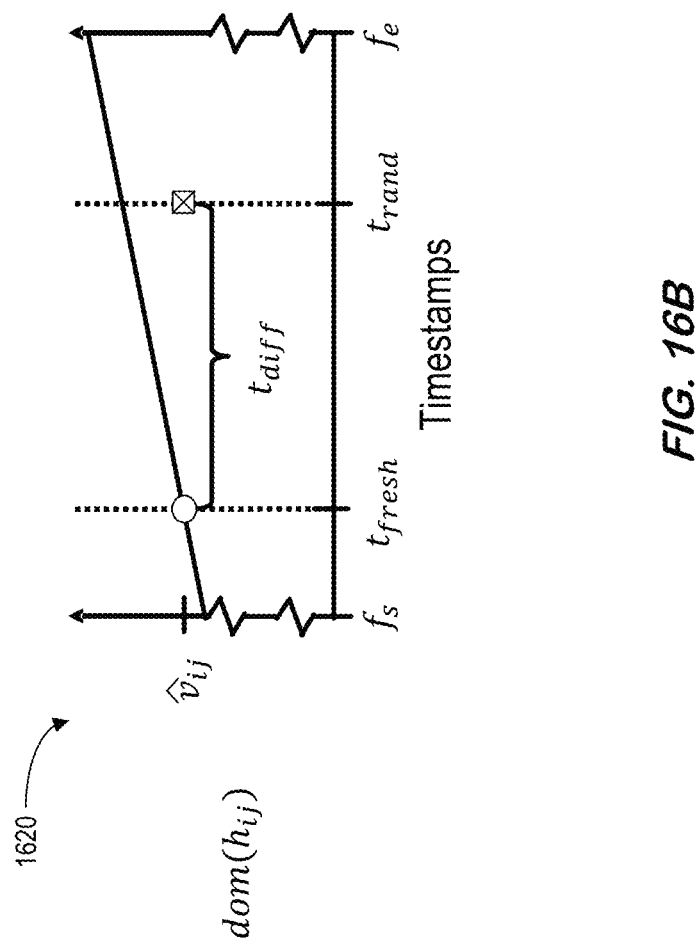
Figure 16C:
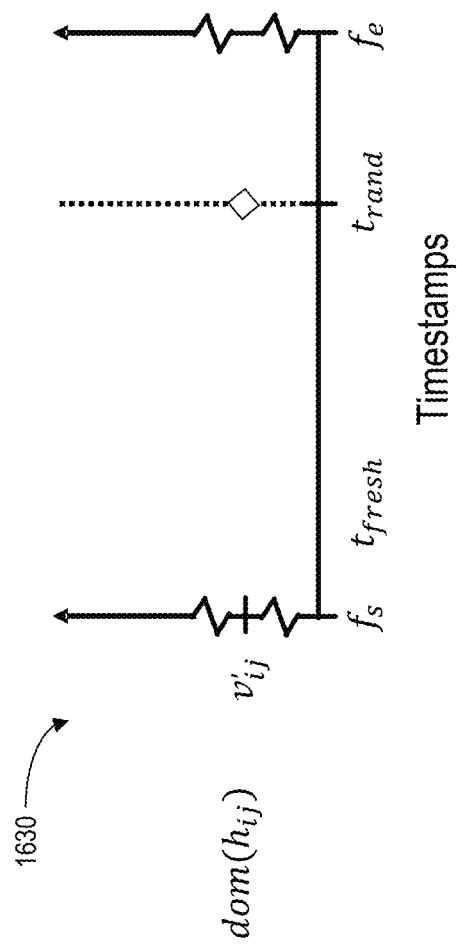

FIGS. 16A through 16C illustrate the prediction of regular, fresh, and subsequent assignments to host variable $h_{ij}$ at a random future timestamp $t_{rand} \in [t, t+\delta)$. Also shown is the predicted SFA(P, , $h_{ij}$) 1612. The value of the fresh assignment is obtained as SFA(P, , $h_{ij}$)[$t_{rand}$] as illustrated 1610 by the line 1612 in FIG. 16A. For the subsequent assignment, the time difference $t_{diff}$ is shown drawn between $t_{fresh}$ and tram as illustrated 1620 in FIG. 16B. The value of the subsequent assignment $\hat{v}_{ij}$ is then obtained as SFA(P, , $h_{ij}$)[$t_{fresh}$]. Finally, value $v'_{ij}$ of a regular assignment is already regularly assigned to $h_{ij}$ as illustrated 1630 in FIG. 16C (see also $v'_{ij}$ in FIG. 14A).

The second phase of the framework feeds the predicted workload into a physical database design advisor (e.g., a table partitioning advisor). According to some embodiments, a table partitioning advisor for column stores to minimize main memory costs in $ while meeting all performance guarantees assured in Service-Level Agreements ("SLAs"). Although $ is used herein as an example, note that embodiments may be associated with any other currency or representation of monetary costs. As the amount of provisioned DRAM dominates hardware costs, this is in particular crucial for DBaaS providers. The advisor may group frequently accessed data into hot column partitions that remain in main memory, and rarely accessed data into cold column partitions that can be moved to cheaper storage layers.

Given (i) the maximum execution time SLA(W) of a workload W in seconds as a performance SLA, (ii) the number of accesses $f(C,W)$ by workload W to column partition C, and (iii) the π-second rule (which accounts for prices, capacities, and performance of recent DRAM and disk) that expresses the economical break-even point between storing data in DRAM versus performing disk IO on each access, a column partition C is classified as hot if it is accessed more frequently than every π-seconds:

$$\pi := \frac{\text{Disk Costs}[\$/\text{sec}]}{\text{Disk } IOP[\text{Page}/\text{sec}]} / DRAM \text{ costs}[\$/\text{Page}/\text{sec}]$$

$$isHot(C, W) \Longleftrightarrow \frac{SLA(W)[\text{sec}]}{f(C, W)} \leq \pi[\text{sec}].$$

The classification of a column partition C determines its cost. Cold-classified column partitions can be pruned during the evaluation of the selection predicate (e.g., as described with respect to FIGS. 1A and 1B) and therefore are not required to be held in DRAM during the workload. Because disk IO is performed instead for each access, their memory costs depend on the number of accessed pages by workload W and the costs in $ per disk IOP. In contrast, a hot-classified column partition depends on the DRAM costs in $/byte/second, the column partition size ‖C‖ in bytes, and the maximum workload execution time SLA(W) in seconds:

$$\mathcal{M}_{workload}(C, W) := \begin{cases} \mathcal{M}_{hot}(C, W)[\$] & \text{if } isHot(C, W) \\ \mathcal{M}_{cold}(C, W)[\$] & \text{otherwise} \end{cases}$$

$$\mathcal{M}_{hot}(C, W) := DRAMCosts\left[\frac{\$/\text{Byte}}{\text{sec}}\right] \cdot \|C\|[\text{Byte}] \cdot SLA(W)[\text{sec}]$$

$$\mathcal{M}_{cold}(C, W) := f(C, W) \cdot \left[\frac{\|C\|[\text{Byte}]}{\text{Page Size}\left[\frac{\text{Byte}}{\text{Page}}\right]}\right] \cdot \frac{\text{Disk Costs}[\$/\text{sec}]}{\text{Disk } IOP\frac{\text{Page}}{\text{sec}}}.$$

According to some embodiments, the physical layout is changed only if the expected benefits of workload cost savings outweigh the costs of data reorganization, a cost model may include table repartitioning costs. A straightforward approach would be to calculate repartitioning costs globally, i.e., at the level of the entire physical layout. However, if an enumeration algorithm operates at the level of column partitions, the system may compute the repartitioning costs per column partition. Further embodiments may model repartitioning costs in $ to be able to compare them to workload costs.

If a column partition C ∈ $L_{fut}$, enumerated in the future layout $L_{fut}$, already exists in the current layout $L_{cur}$, the repartitioning cost may be set to $0. Otherwise, C is created by splitting or merging partitions in $L_{cur}$. In this case, some assumptions might be made:

(1) As column stores often employ read-optimized data structures (e.g., compressed dictionaries) that cannot be modified easily, assume that C is created from scratch.
(2) Each record written to column partition C was read from an existing column partition in $L_{cur}$. Accordingly, assume that the total amount of data accessed during repartitioning is twice the column partition size ‖C‖.
(3) To reduce the impact on performance SLAs, ensure fast repartitioning times by assuming that all data accessed during repartitioning is held in DRAM.
(4) Assume that the system exhibits a repartitioning rate $R_{rate}$ in Byte/sec for creating column partition C, as well as a fixed overhead $R_{ovrhd}$ in sec for initializing C.

Based on these assumptions, the repartitioning costs will first be defined and then the system will combine the workload and repartitioning costs into the total cost in $ of a column partition C ∈ $L_{fut}$:

$$\mathcal{M}_{repart}(C, L_{cur}) :=$$

$$\begin{cases} \$0 & \text{if } C \in L_{cur} \\ DRAMCosts\left[\frac{\frac{\$}{\text{Byte}}}{\text{sec}}\right] 2\|C\|[\text{Byte}]\left(\frac{2\|C\|[\text{Byte}]}{R_{rate}\left[\frac{\text{Byte}}{\text{sec}}\right]} + R_{ovrhd}[\text{sec}]\right) & \text{otherwise} \end{cases}$$

$$\mathcal{M}_{total}(C, W, L_{cur}) := \mathcal{M}_{workload}(C, W) + \mathcal{M}_{repart}(C, L_{cur}).$$

As a second modification, an objective function may be modified. Contrary to some systems, which minimize the workload costs $\mathcal{M}_{workload}$ of the observed workload $\mathcal{O}$, some embodiments propose the future layout $L_{fut}$ that minimizes the combined workload and repartitioning costs $\mathcal{M}_{total}$ of the predicted workload $\mathcal{P}_*$.

$$\operatorname*{argmin}_{L_{fut}} \sum\nolimits_{C \in L_{fut}} \mathcal{M}_{total}(C, \mathcal{P}, L_{cur})$$

A natural question that arises during the optimization of this equation: At which timestamp in the future is a repartitioning beneficial? In general, repartitioning costs can be seen as a mortgage that needs to be amortized by the benefit in terms of workload costs in a future layout. The longer the duration of the predicted workload (i.e., $f_e - f_s$), the more likely the repartitioning costs are amortized. On the contrary, the longer the prediction, the less accurate the prediction becomes. To resolve this conflict, some embodiments calculate the duration of the predicted workload as a prediction confidence factor $\eta \in \mathbb{R}$ times the observation period $\omega \in \mathbb{N}$ (i.e., $o_e - o_s$).

Figure 17:
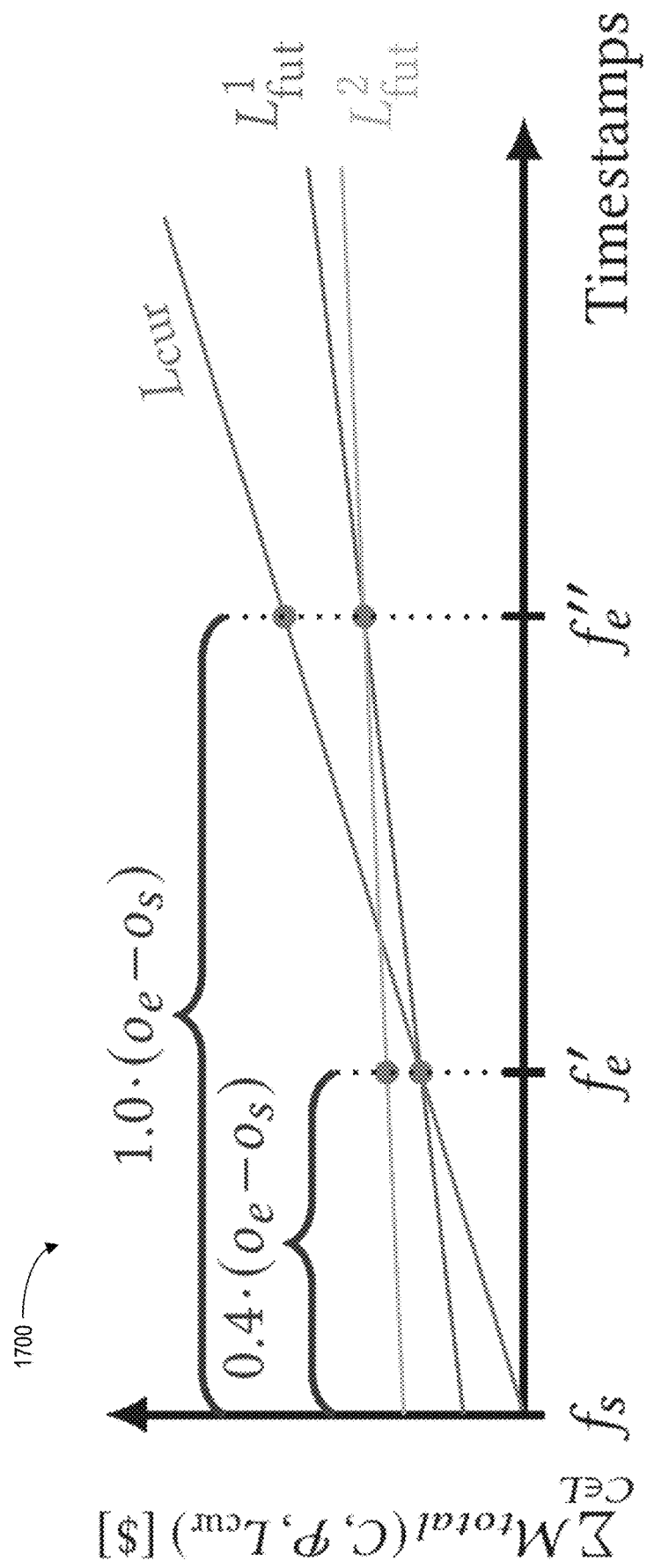
FIG. 17 shows the impact of $\eta$ on the choice of a future database layout according to some embodiments.

$o_s \mathbb{N}$: current timestamp $o_e \mathbb{N}: o_s + \omega$ $f_s \mathbb{N}: o_e$ $f_e \mathbb{N}: f_s + \eta \cdot \omega$ FIG. 17 shows 1700 the impact of $\eta$ on the choice of a future database layout $L_{fut}$ according to some embodiments. The x-axis shows future timestamp $f_s$, $f'_e$, and $f''_e$ depending on the choice of $\eta$. The total costs in $ for $L_{cur}$ and two future layouts $L^1_{fut}$ and $L^2_{fut}$ are shown on the y-axis. The costs for both future layouts are greater than $0 at the y-axis intercept due to repartitioning costs. Observe that $L_{cur}$ is optimal for a short-time prediction as the repartitioning costs of both future layouts are not yet amortized. In contrast, for a mid-term and long-term prediction $L^1_{fut}$ and $L^2_{fut}$ respectively, become optimal.

For the integration of the advisor into the prediction framework, assume a fixed observation period $\omega$ c N and a fixed prediction confidence factor $\eta \in \mathbb{R}$ as prerequisites. Also initialize the start timestamp of the observed workload $o_s$ as the current timestamp and the layout $L_{cur}$ as the current layout. The system can then start the first iteration of the framework by computing the end timestamp of the observed workload $o_e$ as $o_s + \omega$ and waiting until that time. Using the algorithm of Table III, the system next calculates the predicted workload between start timestamp $f_s$ set to $o_e$ and end timestamp $f_e$ set to $f_s + \eta \cdot \omega$ based on the observed workload between timestamps $o_s$ and $o_e$. Afterwards, the predicted workload and the current layout $L_{cur}$ can be fed into the physical database design advisor and the system may switch to the proposed future layout $L_{fut}$. Note that the current layout could also be considered as the best alternative. Finally, we increment $o_s$ by $\eta \cdot \omega$ and start the next iteration of the framework.

During testing, a workload during a regular workday between 08:00 and 20:00 was used. During this period, 401,280,169 SQL statements were executed. An observation period $\omega$ was set to 360 minutes and the prediction confidence factor $\eta$ was set to 1.0. Further, a discretization interval $\delta$ of 5 minutes was used and the parameters for detecting linear and exponential drifts $\varphi_{in}$ and $\varphi_{exp}$ were set to 0.8 each. To detect reoccurring drifts and static workloads, set $\varphi_{cyc}$ and $\varphi_{static}$ to 0.1 each. Both parameters represent a maximal allowed fluctuation (and fluctuations smaller than 10% may be imperceptible). Finally, $R_{rate}$ was set to 133 MB/sec and $R_{ovrhd}$ to 0.16 seconds using an q-error approximation.

The backward-looking approach used by most existing work was used as a baseline, where the observed workload instead of the predicted workload is fed into an advisor. To demonstrate the potential of embodiments described herein, a best-case analysis was performed where the actual future workload is fed into the system. For all approaches, the layout is only changed if the expected benefits of workload cost savings outweigh the costs of table repartitioning.

A memory costs and performance experiment analyzed how the partitioning layouts proposed by embodiments described herein and a backward-looking approach alter the relation between memory costs and workload performance. As hardware costs are dominated by DRAM costs, one may focus on the memory consumption. It was observed that embodiments described herein always outperform a backward-looking approach in terms of performance. For example, with enough available memory (i.e., high memory costs), the proposed framework can improve execution time by 1.4 compared to a backward-looking approach. The main reason for the observed performance improvements and memory cost savings is a sharper separation of frequently and rarely accessed data into hot and cold partitions as compared to the backward-looking approach. This avoids polluting the buffer cache with cold data, allows for more aggressive partition pruning, and speeds up delta merges.

A second experiment evaluated how accurately embodiments predict the future workload. For this, predictions of both the statement arrival rate and the assignment of parameter values to host variables were considered. As a measure how well the observed and predicted statement arrival rate, respectively observed and predicted assignments, match the future statement arrival rate, respectively future assignments, one may use the coefficient of determination $R^2 \in (-\infty,1]$. An $R^2$ score of 1 indicates a perfect prediction, while especially negative values, which are unbounded, represent inaccurate predictions.

For the ten most expensive statements in the SQL plan cache, the $R^2$ score for assignments of the predicted workload have a substantially higher $R^2$ score compared to the observed workload. In addition, the $R^2$ score of the assignments of the predicted workload is frequently close to 1.

A third experiment analyzed the impact of the observation period $\omega$ and the prediction confidence factor $\eta$ on the prediction accuracy. The $R^2$ score for statement $q_6$ for $\omega$ between 60 and 570 minutes were calculated for $\eta$ between 0.1 and 8.0. In general, it was observed that longer observation periods lead to higher $R^2$ scores. Further, the longer the predicted period, i.e., the larger $\eta$ is, the less accurate predictions become. The poor accuracy resulting from $\eta$ larger than 1 is expected as it is no longer possible to detect reoccurring drifts with a period longer than the observation period. The choice of $\omega$ set to 360 minutes and $\eta$ set to 1.0 leads both to accurate predictions and to an amortization of the repartitioning costs due to the long prediction period.

A fourth experiment evaluated how precisely the modified version of advisor estimates table repartitioning costs. For this purpose, 363 random partitioning layouts for different SQL database tables were generated and then randomly split and merged existing partitions in those layouts. For each considered table repartitioning, $R_{rate}$ was set to 133 MB/sec and $R_{ovrhd}$ was set to 0.16 sec as repartitioning costs were measured. There was a strong correlation between the estimated and actual repartitioning costs and the maximum q-error was 2.27.

A fifth and final experiment analyzed the time required by the framework to predict the future workload for observation periods $\omega$ between 60 and 360 minutes and $\eta$ was set to 1.0. The required prediction time ranges between only 1.2% and 3.2% of the observation period. Since the advisor also has a low optimization time, one can conclude that that framework is suitable for practical usage.

Figure 18:
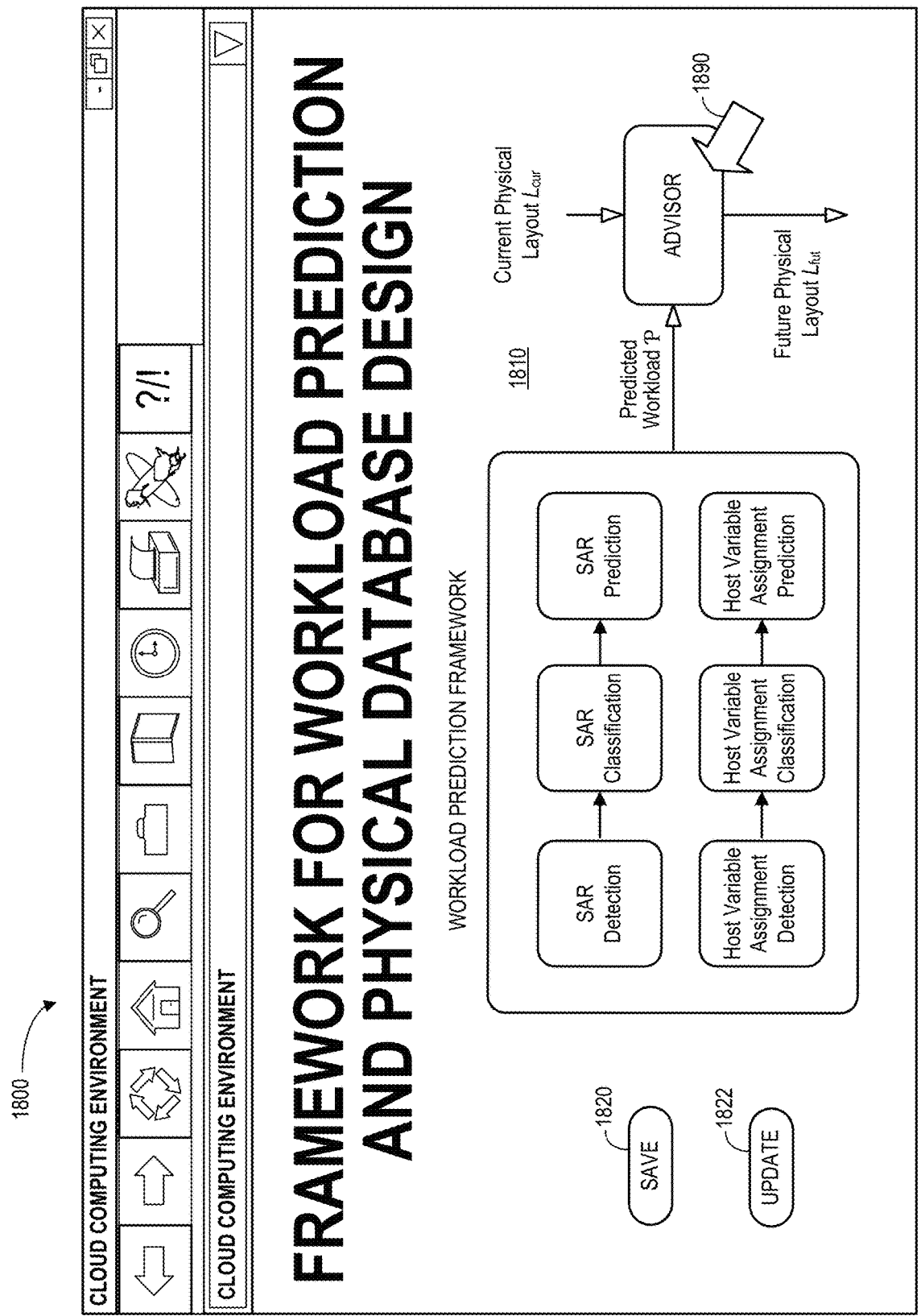
FIG. 18 is a workload prediction and physical database design display according to some embodiments.

FIG. 18 is a framework for workload prediction and physical database design display 1800 according to some embodiments. The display 1800 includes a graphical representation 1810 or dashboard that might be used by an operator or administrator to configure the components described herein (e.g., for a cloud computing environment). In particular, selection of an element (e.g., via a touchscreen or computer mouse pointer 1890) might result in the display of a popup window that contains more detailed data. The display 1800 may also include a user selectable "Save" icon 1820 to store configurations and/or system mappings (e.g., to data sources) and an "Update" icon 1830 to adjust values as appropriate.

Figure 19:
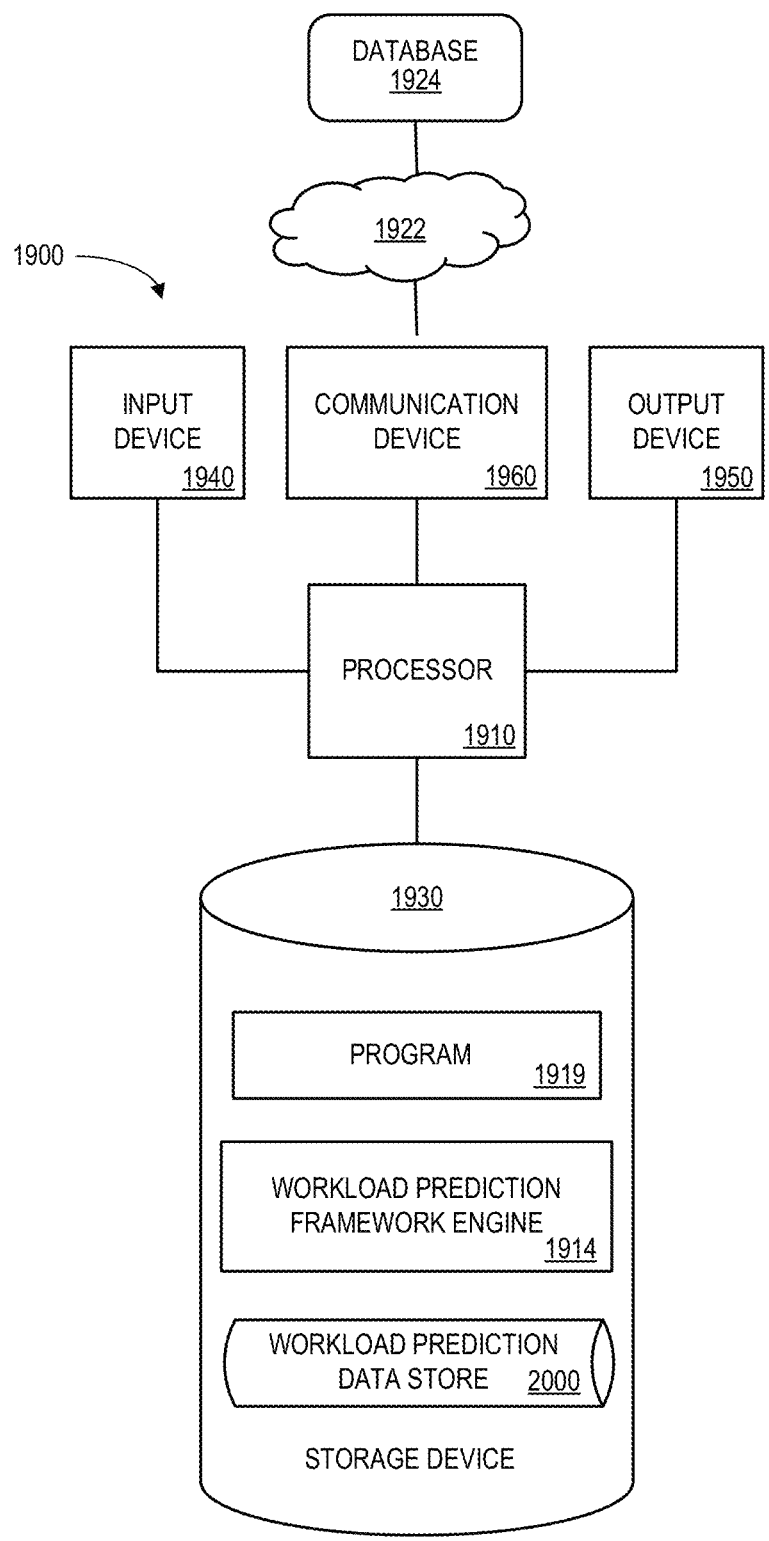
FIG. 19 is an apparatus or platform according to some embodiments.

Note that the embodiments described herein may be implemented using any number of different hardware configurations. For example, FIG. 19 is a block diagram of an apparatus or platform 1900 that may be, for example, associated with the systems 200, 300, 500, and 600 of FIGS. 2, 3, 5, and 6, respectively (and/or any other system described herein). The platform 1900 comprises a processor 1910, such as one or more commercially available Central Processing Units ("CPUs") in the form of one-chip microprocessors, coupled to a communication device 1960 configured to communicate via a communication network (not shown in FIG. 19). The communication device 1960 may be used to communicate, for example, with one or more databases 1924 (e.g., via a communication network 1922), system administrators, etc. The platform 1900 further includes an input device 1940 (e.g., a computer mouse and/or keyboard to input, create and/or manage prediction algorithm parameters) and/an output device 1950 (e.g., a computer monitor to render a display, transmit recommendations, generate alerts, and/or create reports about workload predictions, physical database design recommendations, etc.). According to some embodiments, a mobile device and/or PC may be used to exchange information with the platform 1900.

The processor 1910 also communicates with a storage device 1930. The storage device 1930 may comprise any appropriate information storage device, including combinations of magnetic storage devices (e.g., a hard disk drive), optical storage devices, mobile telephones, and/or semiconductor memory devices. The storage device 1930 stores a program 1912 and/or workload prediction framework engine 1914 for controlling the processor 1910. The processor 1910 performs instructions of the programs 1912, 1914, and thereby operates in accordance with any of the embodiments described herein. For example, the processor 1910 may be associated with a cloud computing environment and receive observed workload information. Based on the observed workload information, a SAR prediction may be generated by the processor 1910. In addition, a host variable assignment prediction may be generated by the processor 1910 based on the observed workload information. The processor 1910 may then use the SAR prediction and the host variable assignment prediction to automatically create a workload prediction for the database. A physical database design advisor (e.g., a table partitioning advisor) may receive the workload prediction and, responsive to the workload prediction, automatically generate a recommended physical layout for the database (e.g., using a cost model, the current physical layout, and an objective function).

The programs 1912, 1914 may be stored in a compressed, uncompiled and/or encrypted format. The programs 1912, 1914 may furthermore include other program elements, such as an operating system, clipboard application, a database management system, and/or device drivers used by the processor 1910 to interface with peripheral devices.

As used herein, information may be "received" by or "transmitted" to, for example: (i) the platform 1900 from another device; or (ii) a software application or module within the platform 1900 from another software application, module, or any other source.

In some embodiments (such as the one shown in FIG. 19), the storage device 1930 further stores a workload prediction data store 2000. An example of a database that may be used in connection with the platform 1900 will now be described in detail with respect to FIG. 20. Note that the database described herein is only one example, and additional and/or different information may be stored therein. Moreover, various databases might be split or combined in accordance with any of the embodiments described herein.

Figure 20:
FIG. 20 is a tabular portion of a workload prediction data store in accordance with some embodiments.

Referring to FIG. 20, a table is shown that represents the workload prediction data store 2000 that may be stored at the platform 1900 according to some embodiments. The table may include, for example, entries identifying workload predictions and physical database design changes for a cloud computing environment. The table may also define fields 2002, 2004, 2006, 2008, 2010, 2012 for each of the entries. The fields 2002, 2004, 2006, 2008, 2010, 2012 may, according to some embodiments, specify a database identifier 2002, an observed workload identifier 2004, SAR prediction data 2006, host variable assignment prediction data 2008, a workload prediction 2010, and a recommended physical layout 2012 for a database. The workload prediction data store 2000 may be created and updated, for example, when new observations are received, a new DBaaS is implemented, etc.

The database identifier 2002 might be a unique alphanumeric label that is associated with an SQL database to be analyzed and/or optimized. The observed workload identifier 2004 may be a file associated with a substantial number of historic statements. The SAR prediction data 2006 and host variable assignment prediction data 2008 may be automatically generates by any of the embodiments described herein (e.g., based on the observed workload). The workload prediction 2010 may be created by combining the SAR prediction data 2006 and host variable assignment prediction data 2008. The recommended physical layout for a database may be generated by an advisor based on the workload prediction and the current physical layout (e.g., an advisor associated with table partitioning, data compression, buffer pool size, another advisor that is based on access counters of a workload, etc.).

Thus, embodiments may provide accurate and efficient workload predictions which can serve as an input to a physical database design advisor (e.g., in a cloud computing environment). The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 21:
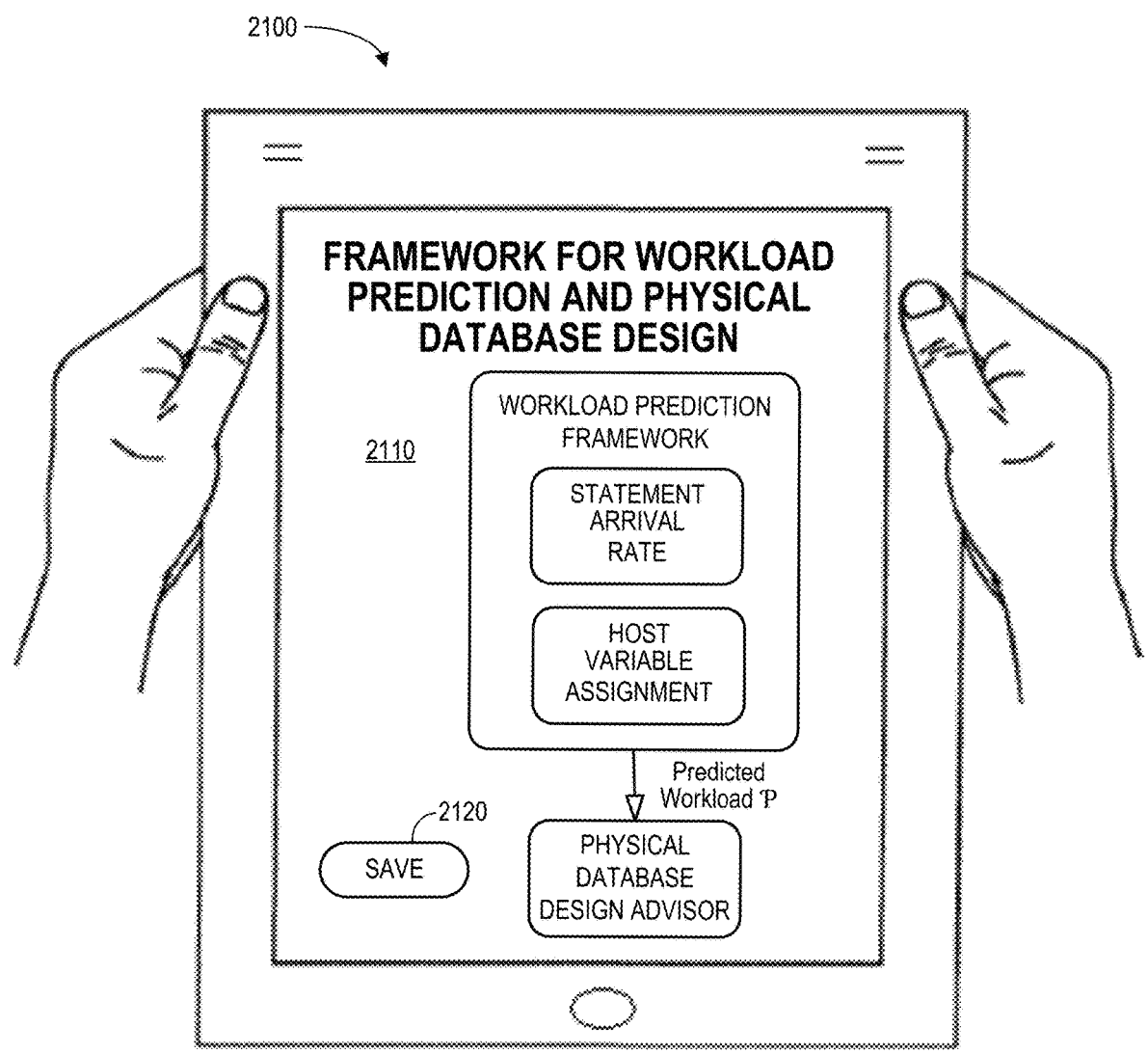
FIG. 21 illustrates a tablet computer according to some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of statements and advisors, etc., any of the embodiments described herein could be applied to other types of statements and advisors. Moreover, the displays shown herein are provided only as examples, and any other type of user interface could be implemented. For example, FIG. 21 illustrates a tablet computer 2100 providing a framework for workload prediction and physical database design display 2110. The display 2110 might be used, for example, to create recommended database adjustments to improve performance/costs in a cloud computing or other environment. Moreover, the display 2110 might be used to update and/or create prediction algorithms, layout recommendations, etc. via a "Save" icon 2120.

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A system associated with a cloud computing environment, comprising:
   a workload prediction framework, including:
      a computer processor, and
      a computer memory storing instructions that, when executed by the computer processor, cause the workload prediction framework to:
         receive observed workload information associated with a database in the cloud computing environment,
         based on the observed workload information, generate a Statement Arrival Rate ("SAR") prediction,
         based on the observed workload information, generate a host variable assignment prediction, and
         using the SAR prediction and the host variable assignment prediction to automatically create a workload prediction for the database; and
   a physical database design advisor, coupled to the workload prediction framework, to receive the workload prediction and, responsive to the workload prediction and a current physical layout of the database, automatically generate a recommended physical layout for the database.

2. The system of claim 1, wherein the workload prediction is associated with at least one of: (i) a linear workload drift, (ii) an exponential workload drift, (iii) a reoccurring workload drift, (iv) a static workload, and (v) an irregular workload drift.

3. The system of claim 2, wherein the workload prediction is based on a combination of multiple workload drift types.

4. The system of claim 1, wherein the SAR prediction is generated by the following algorithm:
discretizing the observed workload,
detecting at least one workload drift type,
classifying multiple workload drift types, and
predicting a future SAR using an observed SAR and the classified workload drift.

5. The system of claim 1, wherein the host variable assignment prediction is generated by the following algorithm:
detecting and classifying an assignment using a threshold interval, and
predicting future fresh assignments and a modeled distribution of subsequent and regular assignments.

6. The system of claim 1, wherein the workload prediction is based on: (i) regular assignments, (ii) fresh assignments, and (iii) subsequent assignments.

7. The system of claim 1, wherein the physical database design advisor is associated with at least one of: (i) a table partitioning advisor, (ii) an index advisor, (iii) a data compression advisor, (iv) a buffer pool size advisor, and (v) any other advisor that is based on access counters of a workload.

8. The system of claim 1, wherein the physical database design advisor is associated a table partitioning advisor that utilizes a cost model, a current physical layout, and an objective function.

9. The system of claim 8, wherein the table partitioning advisor computes repartitioning costs on a per-column partition basis.

10. The system of claim 9, wherein the table partitioning advisor proposes a future layout that minimizes a combined workload and repartitioning cost of the workload prediction.

11. A computer-implemented method associated with a cloud computing environment, comprising:
receiving, by a computer processor of a workload prediction framework, observed workload information associated with a database in the cloud computing environment;
based on the observed workload information, generating a Statement Arrival Rate ("SAR") prediction;
based on the observed workload information, generating a host variable assignment prediction;
automatically creating a workload prediction for the database using the SAR prediction and the host variable assignment prediction; and
responsive to the workload prediction and a current physical layout of the database, automatically generating a recommended physical layout for the database by a physical database design advisor.

12. The method of claim 11, wherein the workload prediction is associated with at least one of: (i) a linear workload drift, (ii) an exponential workload drift, (iii) a reoccurring workload drift, (iv) a static workload, and (v) an irregular workload drift.

13. The method of claim 12, wherein the workload prediction is based on a combination of multiple workload drift types.

14. The method of claim 11, wherein the SAR prediction is generated by the following algorithm:
discretizing the observed workload,
detecting at least one workload drift type,
classifying multiple workload drift types, and
predicting a future SAR using an observed SAR and the classified workload drift.

15. The method of claim 11, wherein the host variable assignment prediction is generated by the following algorithm:
detecting and classifying an assignment using a threshold interval, and
predicting future fresh assignments and a modeled distribution of subsequent and regular assignments.

16. The method of claim 11, wherein the workload prediction is based on: (i) regular assignments, (ii) fresh assignments, and (iii) subsequent assignments.

17. A non-transitory, computer-readable medium storing instructions, that, when executed by a processor, cause the processor to perform a method associated with a cloud computing environment, the method comprising:
receiving, by a computer processor of a workload prediction framework, observed workload information associated with a database in the cloud computing environment;
based on the observed workload information, generating a Statement Arrival Rate ("SAR") prediction;
based on the observed workload information, generating a host variable assignment prediction;
automatically creating a workload prediction for the database using the SAR prediction and the host variable assignment prediction; and
responsive to the workload prediction and a current physical layout of the database, automatically generating a recommended physical layout for the database by a physical database design advisor.

18. The medium of claim 17, wherein the physical database design advisor is associated with at least one of: (i) a table partitioning advisor, (ii) an index advisor, (iii) a data compression advisor, (iv) a buffer pool size advisor, and (v) any other advisor that is based on access counters of a workload.

19. The medium of claim 17, wherein the physical database design advisor is associated a table partitioning advisor that utilizes a cost model, a current physical layout, and an objective function.

20. The medium of claim 19, wherein the table partitioning advisor computes repartitioning costs on a per-column partition basis.

21. The medium of claim 20, wherein the table partitioning advisor proposes a future layout that minimizes a combined workload and repartitioning cost of the workload prediction.

* * * * *